US009524023B2

(12) United States Patent
Ahn et al.

(10) Patent No.: US 9,524,023 B2
(45) Date of Patent: Dec. 20, 2016

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Jae Hong Ahn, Yongin-si (KR); Gyung Chan Seol, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 136 days.

(21) Appl. No.: 14/056,472

(22) Filed: Oct. 17, 2013

(65) Prior Publication Data

US 2014/0111420 A1    Apr. 24, 2014

(30) Foreign Application Priority Data

Oct. 19, 2012    (KR) .................. 10-2012-0116956

(51) Int. Cl.
*G06F 3/01*    (2006.01)
*G06F 3/16*    (2006.01)
*G02B 27/01*    (2006.01)

(52) U.S. Cl.
CPC ............. *G06F 3/013* (2013.01); *G02B 27/017* (2013.01); *G06F 3/017* (2013.01); *G06F 3/167* (2013.01);
(Continued)

(58) Field of Classification Search
CPC ......... G06F 3/013; G06F 3/017; G06F 3/0482
See application file for complete search history.

(56) References Cited

U.S. PATENT DOCUMENTS 6,553,281 B1    4/2003  Liu
8,743,021 B1 *  6/2014  Park ...................... G06F 3/0483
                                                345/1.1
(Continued)

FOREIGN PATENT DOCUMENTS

CA   WO 2012083415 A1 *  6/2012  ............. G06F 3/013
DE       102008025124 A1    12/2009
(Continued)

OTHER PUBLICATIONS

European Search Report issued Dec. 10, 2014 in corresponding European Patent Application No. 13188743.2.
(Continued)

*Primary Examiner* — Lixi C Simpson
(74) *Attorney, Agent, or Firm* — Staas & Halsey LLP

(57) ABSTRACT

A display apparatus including a recognition unit to recognize a gaze of a user, a controller to determine whether the recognized gaze is within a predetermined recognition region and to control entry into an interactive mode upon determining that the recognized gaze is within the predetermined recognition region, and a display unit to display an image corresponding to the interactive mode. A user's gaze is tracked to perform entry into an interactive mode, thereby easily achieving entry into the interactive mode and performing more intuitive interaction. In addition, a multimodal interactive mode including a combination of face recognition, voice recognition, and gaze recognition is performed, thereby performing a more extended interactive mode and accurately determining a user command. As a result, functions are correctly performed, thereby improving user convenience.

19 Claims, 20 Drawing Sheets

(52) U.S. Cl.
CPC . *G02B 2027/014* (2013.01); *G02B 2027/0187* (2013.01)

(56) References Cited

U.S. PATENT DOCUMENTS

| | | | |
|---|---|---|---|
| 2003/0038754 A1 | 2/2003 | Goldstein et al. | |
| 2009/0077493 A1 | 3/2009 | Hempel et al. | |
| 2009/0217211 A1* | 8/2009 | Hildreth | G06F 3/017 715/863 |
| 2009/0306991 A1* | 12/2009 | Yoon | H04N 5/44543 704/275 |
| 2010/0121501 A1 | 5/2010 | Neugebauer et al. | |
| 2011/0084897 A1 | 4/2011 | Manoharan et al. | |
| 2011/0154014 A1* | 6/2011 | Thorn | H04M 1/7253 713/150 |
| 2011/0161890 A1 | 6/2011 | Anderson et al. | |
| 2013/0007668 A1* | 1/2013 | Liu | G06F 3/012 715/841 |
| 2015/0000026 A1* | 1/2015 | Clements | G06F 3/013 4/443 |

FOREIGN PATENT DOCUMENTS

| | | |
|---|---|---|
| JP | 2001-350578 | 12/2001 |
| KR | 10-2010-0064177 | 6/2010 |
| KR | 10-1191640 | 10/2012 |
| RU | 2006 147 230 | 7/2008 |
| WO | 2011/014467 | 2/2011 |
| WO | 2012/083415 | 6/2012 |

OTHER PUBLICATIONS

"Samsung series 8 [8000] user manual" Oct. 11, 2012, retrieved from the internet: http://download.sears.com/docs/spin_prod_807917512.pdf.

"Samsung Smart TV Quick Setup Guide" Mar. 6, 2012, retrieved from the internet: http://downloadcenter.samsung.com/content/UM/201203/20120306152130567/[SIGuide-NA]BN68-04374A-04Eng-0303-1.pdf.

"Support—LED TV UN55ES8000F |Samsung TVs | Manuals" Apr. 8, 2014, retrieved from the internet: http://www.samsung.com/us/support/owners/product/UN55ES8000FXZA.

International Search Report issued Dec. 19, 2013 in corresponding Application No. PCT/KR2013/008073.

European Office Action mailed Dec. 1, 2015 in related European Application No. 13188743.2.

Russian Office Action dated Jun. 27, 2016 from Russian Patent Application No. 2015114537/08(022696), 11 pages.

Mexican Office Action dated Sep. 5, 2016 from Mexican Patent Application No. MX/a/2015/004841, 2 pages.

European Office Action dated Sep. 28, 2016 from European Patent Application No. 13188743.2, 7 pages.

* cited by examiner

DISPLAY APPARATUS AND CONTROL METHOD THEREOF

CROSS-REFERENCE TO RELATED APPLICATIONS

This application claims the benefit of Korean Patent Application No. 10-2012-0116956, filed on Oct. 19, 2012 in the Korean Intellectual Property Office, the disclosure of which is incorporated herein by reference.

BACKGROUND

1. Field

Embodiments of the present disclosure relate to a display apparatus that improves recognition accuracy of information input by a user and a control method thereof.

2. Description of the Related Art

A display apparatus displays stereoscopic images.

In recent years, there have been developed flat display devices which have lower weight and volume than a cathode ray tube and may be installed in a wide variety of spaces, thereby easily achieving large-sized image realization, flat structure, and high quality.

Representative examples of such flat display devices include a liquid crystal display device (LCD), electroluminescent display device (ELD), field emission display device (FED), plasma display panel (PDP), thin film transistor liquid crystal display device (TFT-LCD), and flexible display device.

Such display devices include recognition technologies for improved user convenience.

Examples of the recognition technologies include a motion recognition technology and a voice recognition technology. The motion recognition technology is technology for recognizing a user's motion using a motion sensor and determining a user command from the recognized motion. The voice recognition technology is technology for recognizing a user's voice using a voice sensor and determining a user command from the recognized voice.

In these recognition technologies, a function that is not desired by a user may be executed or user input may not be performed if the motion or the voice is not correctly input. For this reason, operations may have to be repeatedly performed, which provides inconvenience to a user.

In addition, certain functions may be unintentionally executed due to a motion or voice unconsciously issued by the user.

Also, in a case in which the motion recognition technology is applied to a display device, a motion that is not often performed by the user or a motion having high discrimination may be selected and set using a command although motions that may be performed by the user are restricted. As a result, selection of a motion to set a command may be difficult.

SUMMARY

It is an aspect of the present disclosure to provide a display apparatus that recognizes a user's gaze to enter an interactive mode and displays the position of the gaze as a cursor and a control method thereof.

It is another aspect of the present disclosure to provide a display apparatus that recognizes a user's gaze and motion or simultaneously recognizes a user's gaze and voice to control operations and functions and a control method thereof.

Additional aspects of the disclosure will be set forth in part in the description which follows and, in part, will be apparent from the description, or may be learned by practice of the disclosure.

In accordance with one aspect of the present disclosure, a display apparatus includes a recognition unit to recognize a gaze of a user, a controller to determine whether the recognized gaze is within a predetermined recognition region and to control entry into an interactive mode upon determining that the recognized gaze is within the predetermined recognition region, and a display unit to display an image corresponding to the interactive mode.

The display unit may display the predetermined recognition region.

When the gaze is recognized, the controller may display information of the predetermined region differently from display information before the gaze is recognized.

The display unit may display a position of the recognized gaze as a cursor.

The recognition unit may recognize a motion of the user, and the controller may determine an operation command corresponding to the recognized motion and control driving of the display unit based on the determined operation command.

The recognition unit may recognize a voice of the user, and the controller may determine an operation command corresponding to the recognized voice and control driving of the display unit based on the determined operation command.

Upon entering the interactive mode, the controller may control display of a plurality of recognition modes for interaction with the user and select one from among the recognition modes based on a position of the recognized gaze.

The display apparatus may further include an image collection unit to collect an image of the user and a sound collection unit to collect a voice of the user, wherein the controller may control activation of the image collection unit and the sound collection unit based on the selected recognition mode.

The recognition unit may recognize a face of the user, and the controller may determine whether the recognized user is a preregistered user and, upon determining that the recognized user is the preregistered user, control gaze recognition of the user.

In a case in which a plurality of users is recognized, the controller may control gaze recognition of a user having highest priority based on prestored priorities.

The controller may determine whether the recognized gaze is within a predetermined end region and, upon determining that the recognized gaze is within the predetermined end region, control the interactive mode to be completed.

In accordance with another aspect of the present disclosure, a display apparatus includes a first recognition unit to recognize a gaze of a user, a second recognition unit to recognize a command from the user, a controller to determine whether the recognized gaze is within a predetermined recognition region, to control entry into an interactive mode upon determining that the recognized gaze is within the predetermined recognition region, and to selectively control a plurality of functions based on the recognized gaze and command, and a display unit to display an image corresponding to the interactive mode and an image corresponding to the selectively controlled function.

The second recognition unit may recognize at least one signal selected from between a motion and voice of the user and recognize an operation command corresponding to the at least one recognized signal.

When a motion is recognized in a state in which the gaze is within the predetermined region, the controller may confirm a command corresponding to the recognized motion and control execution of a function corresponding to the confirmed command.

When a voice is recognized in a state in which the gaze is within the predetermined region, the controller may confirm a command corresponding to the recognized voice and control execution of a function corresponding to the confirmed command.

The functions may include at least one selected from among reproduction of an external broadcast signal, reproduction of external content, a reproduction mode, and a screen adjustment mode.

The display apparatus may further include a communication unit to receive a sound signal transmitted from an external remote controller, wherein the second recognition unit may recognize a voice from the received sound signal.

In accordance with another aspect of the present disclosure, a display apparatus includes a tuner to receive an external broadcast signal, a signal processor to separate the broadcast signal into an image signal having image information and a sound signal having sound information and to signal-process the separated image signal and sound signal, a recognition unit to recognize a gaze of a user, a controller to determine whether the recognized gaze is within a predetermined recognition region and to control entry into an interactive mode upon determining that the recognized gaze is within the predetermined recognition region, a display unit to display the signal-processed image signal and an image corresponding to the interactive mode, and a sound output unit to output the signal-processed sound signal.

The display unit may display the predetermined recognition region, a channel button, and a volume button and display a position of the recognized gaze as a cursor.

When the gaze of the user is outside the region of the display unit, the controller may control the interactive mode to be completed.

The display apparatus may further include a collection module to collect at least one kind of information selected from between a voice and image of the user, wherein the recognition unit may recognize an operation command corresponding to the at least one kind of information, and, upon entering the interactive mode, the controller may control at least one function based on the recognized command.

In accordance with a further aspect of the present disclosure, a control method of a display apparatus includes recognizing a gaze of a user, determining whether the recognized gaze is within a predetermined recognition region, entering an interactive mode upon determining that the recognized gaze is within the predetermined recognition region, displaying a plurality of recognition modes for interaction with the user, determining a recognition mode corresponding to a position of the recognized gaze from among the displayed recognition modes, executing the determined recognition mode to recognize a command from the user, and executing a function corresponding to the recognized command.

The control method may further include displaying the predetermined recognition region as different display information upon entering the interactive mode.

The entering the interactive mode may include determining whether the gaze is pointed at the predetermined region for a predetermined period of time.

The executing the determined recognition mode to recognize the command from the user may include recognizing a motion of the user when the determined recognition mode is a motion mode and determining a command corresponding to the recognized motion.

The executing the determined recognition mode to recognize the command from the user may include recognizing a voice of the user when the determined recognition mode is a voice mode and determining a command corresponding to the recognized voice.

The control method may further include recognizing a face of the user, determining whether the recognized user is a preregistered user, recognizing a gaze of the user upon determining that the recognized user is the preregistered user.

The control method may further include determining whether the recognized gaze is within a predetermined end region and completing the interactive mode upon determining that the recognized gaze is within the predetermined end region.

The control method may further include. when a motion is recognized in a state in which the gaze is within the predetermined region, confirming a command corresponding to the recognized motion and controlling execution of a function corresponding to the confirmed command.

The control method may further include, when a voice is recognized in a state in which the gaze is within the predetermined region, confirming a command corresponding to the recognized voice and controlling execution of a function corresponding to the confirmed command.

The control method may further include receiving a voice signal transmitted from an external remote controller and recognizing a command from the received voice signal.

The control method may further include completing the interactive mode when the gaze of the user is outside the region of the display unit for a predetermined period of time or more.

The control method may further include displaying a position of the recognized gaze as a cursor.

The control method may further include completing the interactive mode when a position of the recognized gaze alternately moves inside and outside the predetermined recognition region.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
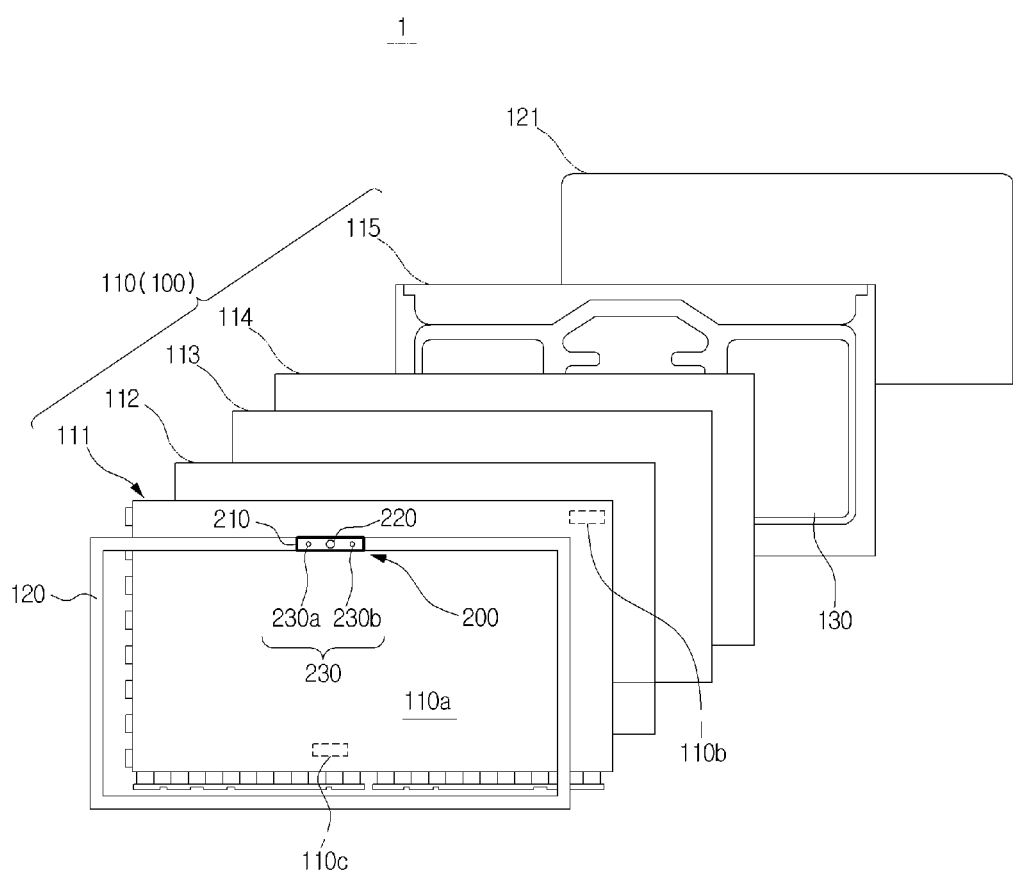
FIG. 1 is a view illustrating a display apparatus according to an embodiment.

Reference will now be made in detail to the embodiments of the present disclosure, examples of which are illustrated in the accompanying drawings, wherein like reference numerals refer to like elements throughout.

FIG. 1 is a view illustrating a display apparatus according to an embodiment. Hereinafter, the construction of the display apparatus will be described with reference to FIGS. 2A to 4.

The display apparatus is an image display apparatus, such as a television, monitor, or display device of a mobile communication terminal. As shown in FIG. 1, the display apparatus 1 includes a main body 100 to display an image and a collection module 200 to collect image information and voice information of a user, which will be described in more detail.

The main body 100 includes a display unit 110 to display an image and a bezel 120 to cover an image non-display region.

The display unit 110 includes a display region 110a to display a main image requested by a user, a recognition region 110b to enable entry into an interactive mode, and an end region 110c to enable end of the interactive mode.

That is, the recognition region 110b is a region at which a user looks to enter the interactive mode, and the end region 110c is a region at which the user looks to complete the interactive mode.

The display unit 110 displays the recognition region 110b and the end region 110c as display information distinguished from the display region 110a such that the user may discriminate therebetween.

Figure 2A:
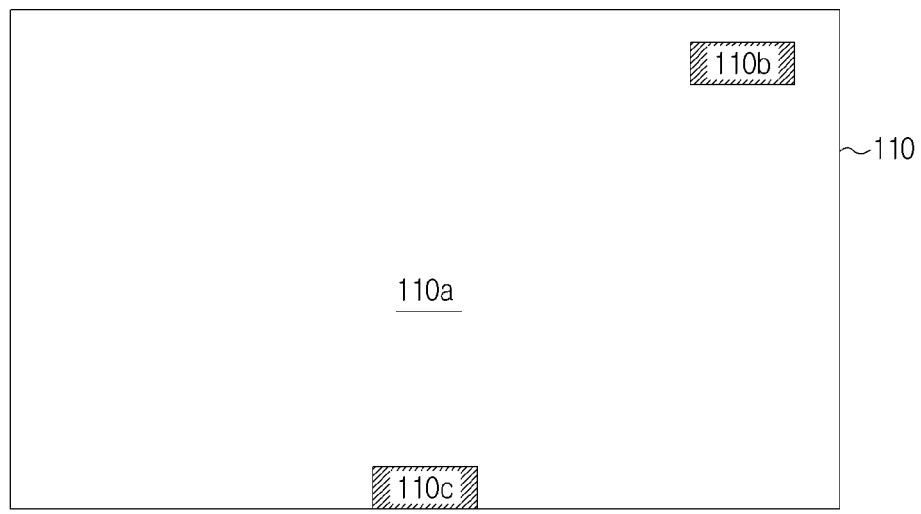
FIGS. 2A-2C, 3A, 3B and 4 are views illustrating display of the display apparatus according to the embodiment.
Figure 2B:
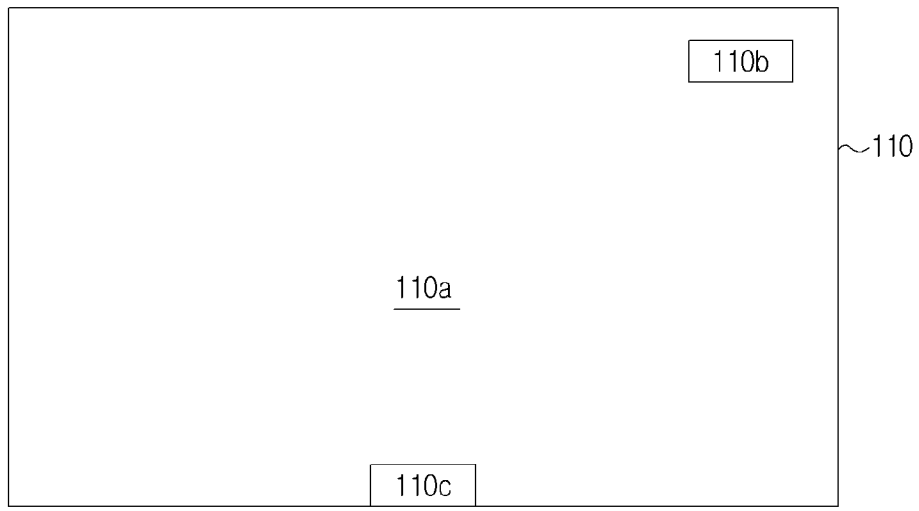
Figure 2C:
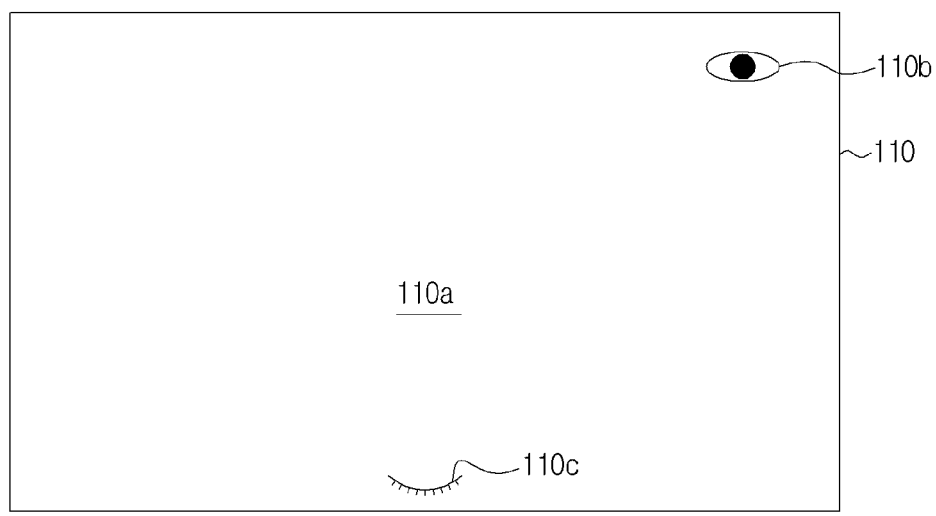

For example, as shown in FIGS. 2A and 2B, the recognition region 110b and the end region 110c may be displayed in the display region 110a as figures filled with semitransparent colors or contour lines of semitransparent colors. Alternatively, as shown in FIG. 2C, the recognition region 110b and the end region 110c may be displayed as semitransparent icons.

At this time, the display unit 110 displays the recognition region 110b and the end region 110c in the display region 110a in an overlapping fashion.

Also, the recognition region 110b and the end region 110c may be displayed as opaque symbols (figures, contour lines, icons, etc.) of sizes which do not interfere with a user in viewing the main image displayed in the display region 110a.

The display unit 110 may periodically display the recognition region 110b and the end region 110c at predetermined time intervals. Alternatively, the display unit 110 may display a message regarding positions of the recognition region 110b and the end region 110c and use of an interactive mode at the time of initial operation.

In addition, the display unit 110 operates differently before and after entry into the interactive mode. That is, display unit 110 displays the recognition region 110b as different display information before and after entry into the interactive mode.

For example, as shown in FIG. 3A, the recognition region 110b may be displayed as an empty figure before entry into the interactive mode, and an icon may be displayed in the empty figure of the recognition region 110b after entry into the interactive mode. Alternatively, as shown in FIG. 3B, the recognition region 110b may be displayed as a figure of a first color before entry into the interactive mode, and the recognition region 110b may be displayed as a figure of a second color after entry into the interactive mode.

Also, the display unit 110 may display only the recognition region 110b without displaying the end region 110c and, after entry into the interactive mode, may display the end region 110c.

After entry into the interactive mode, the display unit 110 maintains display information according to the entry into the interactive mode to inform a user that the interactive mode is being executed.

For example, the display of the icon in the figure of the recognition region 110b or the second color of the figure of the recognition region 110b may be maintained.

After entry into the interactive mode, the display unit 110 displays a plurality of recognition modes used to control operations and functions of the display apparatus.

Figure 4:
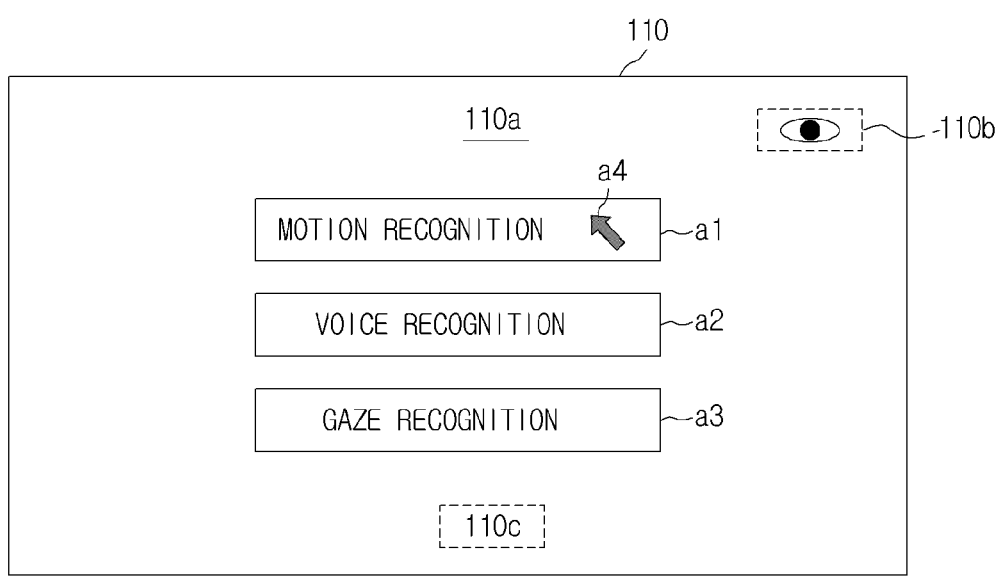

As shown in FIG. 4, a recognition mode for interaction between a user and the display apparatus is displayed. As an example, the display unit 110 displays a motion recognition button a1, a voice recognition button a2, and a gaze recognition button a3 in the display region 110a. At this time, the display unit 110 displays the user's gaze as a cursor a4.

Also, the display unit 110 displays an image of content requested by the user. In a case in which screen adjustment information is changed by the user, the display unit 110 displays an image based on the changed screen adjustment information.

The display unit 110 includes a display panel 111, a diffusion plate 112, a light guide plate 113, a backlight unit 114, and a chassis 115.

The display panel 111 displays an image, such as text, numbers, or arbitrary icons.

The display unit 110 further includes glass (not shown) and a filter (not shown) to protect the display panel 111 from external impact. The glass prevents the filter from being broken by the external impact.

The filter includes an optical property film, an electromagnetic interference (EMI) shielding film, and an infrared shielding film.

The optical property film decreases the brightness of red (R) and green (G) light incident upon the display panel and increases the brightness of blue (B) light, thereby improving optical properties. The EMI shielding film shields electromagnetic interference to prevent electromagnetic waves incident upon the display panel from being discharged outside.

Also, the infrared shielding film shields infrared light emitted from the display panel to prevent more than a predetermined amount of infrared light from being discharged outside such that infrared-based signals, such as signals generated by a remote controller, are normally transmitted to the display panel.

The diffusion plate 112 is a semitransparent panel to diffuse light emitted from the backlight unit 114 along the surface thereof such that colors and brightness are uniform throughout the screen. The diffusion plate 112 improves the brightness of light emitted from the backlight unit 114 and supplies light having such improved brightness to the display panel. That is, the diffusion plate 112 increases the amount of light emitted from light emitting diodes (LEDs) of the backlight unit 114 and uniformly maintains brightness throughout the screen.

The light guide plate 113 enables light from the backlight unit 114 to be uniformly incident upon the entire display panel, and the backlight unit 114 emits light from the rear or the side of the display panel 111.

Since the display panel 111 does not emit light, the display panel 111 adjusts the transmission amount and colors of the light emitted from the backlight unit such that an image is displayed on the display panel 111.

The chassis 115 is a panel, to which a drive module 130 necessary for image display and sound output is connected.

Examples of the drive module 130 may include various printed circuit boards to control image display and sound output, an interface device for connection with external equipment, and a power supply to supply power to the respective devices.

The chassis 115 is made of metal exhibiting high heat dissipation and strength.

The bezel 120 covers the image non-display region of the display unit 110 to form the external appearance of the display unit 110.

An input unit (not shown) having a plurality of buttons may be further disposed at the bezel 120. That is, an operation command may be input to the display apparatus 1 through the input unit.

The main body 100 further includes a cover 121 to protect the image non-display region of the display unit 110 and a support member (not shown) to support the display panel, the diffusion plate, the light guide plate, the backlight unit, and the chassis of the display unit 110 in a separated state. The support member and the cover 121 may be detachably coupled to the bezel 120.

The cover 121 is coupled to the bezel 120 to form a receiving space. The display panel, the diffusion plate, the light guide plate, the backlight unit, and the chassis are disposed in the receiving space.

The collection module 200 is provided at the upper end of the bezel 120 of the main body 100 to collect an image and sound of a user and surroundings of the user and to transmit the collected image and sound to the drive module 130.

The collection module 200 may be mounted at a position where user information is easily collected in addition to the upper end of the bezel 120 of the main body 100.

Also, the collection module 200 may be provided separately from the display apparatus. That is, the collection module 200 may be provided separately from the display apparatus such that the collection module 200 is connected to the interface device (not shown) provided at the main body 100.

Hereinafter, the collection module 200 will be described in more detail.

The collection module 200 (multimedia over internet protocol; MOIP) includes a housing 210, an image collection unit 220, such as a camera, mounted in the housing 210, a sound collection unit 230, such as a first microphone, mounted in the housing 210, and a first microprocessor (not shown) to control driving of the camera and the first microphone and to transmit image signals and sound signals collected by the camera and the first microphone to the drive module 130.

The first microphone may include a plurality of microphones 230*a* and 230*b*.

The image collection unit 220, i.e. the camera, collects an image of a user and surroundings of the user and transmits the collected image data to the first microprocessor.

The sound collection units 230*a* and 230*b*, i.e. the first microphones, collect sound of surroundings of a user including a voice of the user and transmit the collected sound data to the first microprocessor.

The first microprocessor transmits the received image data and sound data to the drive module 130. In addition, the first microprocessor may control the received image data and sound data to be stored in a memory (not shown).

The collection module 200 may further include a communication unit (not shown), such as Ethernet. In this case, the first microprocessor of the collection module (MOIP) compresses an image signal and sound signal and transmits the compressed data to the drive module 130 via Ethernet.

In addition, the camera 220 and the first microphone 230 of the collection module may be directly connected to the drive module 130 to directly transmit the image signal and sound signal to the drive module.

Figure 5:
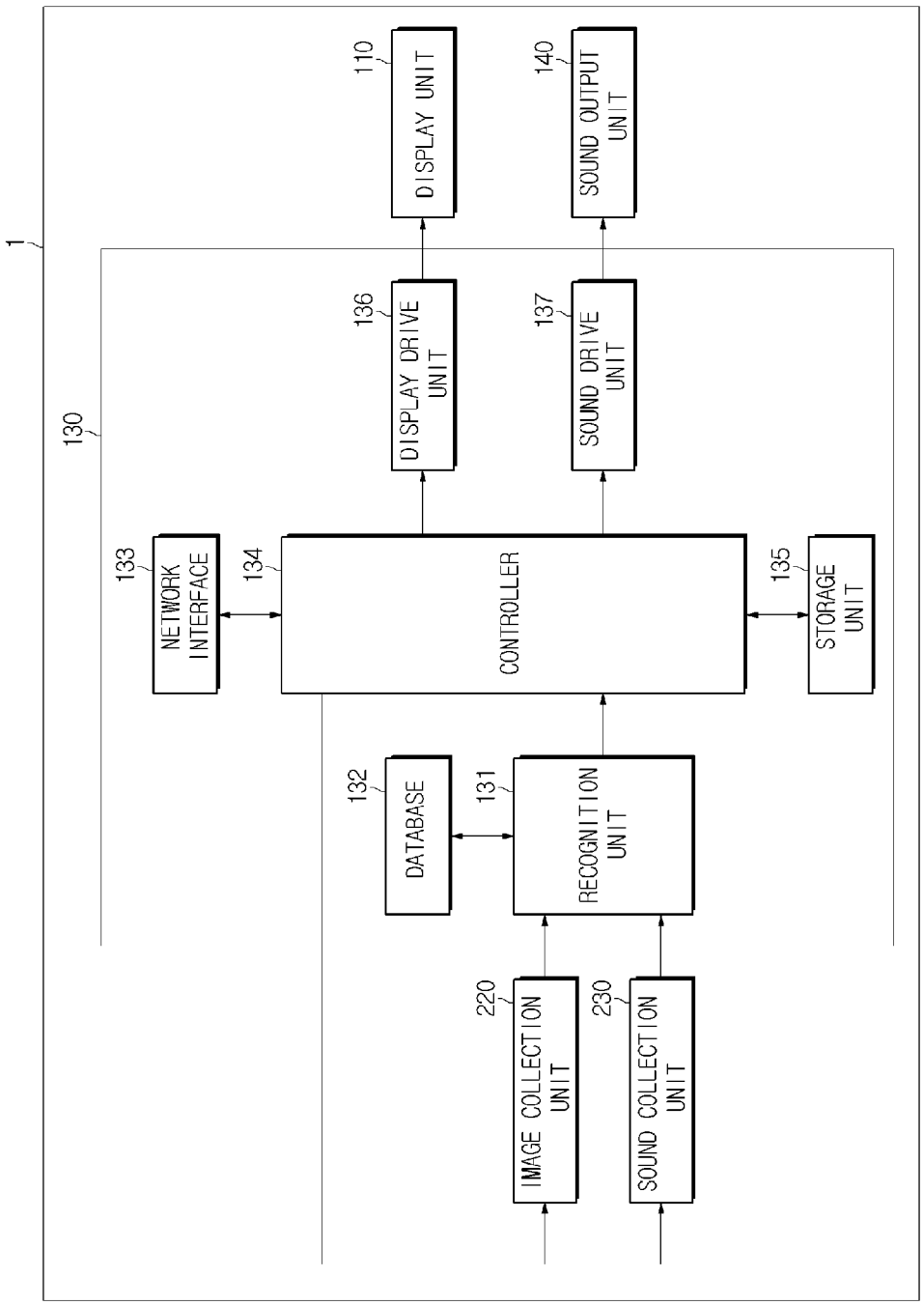
FIG. 5 is a control block diagram of the display apparatus according to the embodiment.

FIG. 5 is a control block diagram of the display apparatus according to the embodiment. Hereinafter, the construction of the display apparatus will be described with reference to FIGS. 6 and 7.

In this embodiment, the display apparatus 1 is operated based on an interaction signal generated according to user intention and/or a signal from the input unit (not shown).

The display apparatus 1 includes the image collection unit 220 and the sound collection unit 230 as the collection module to collect a user command, the drive module 130 to control the operation of the display apparatus 1 based on an operation command, and the display unit 110 and a sound output unit 140 as an output module to output operation execution.

The image collection unit 220 is electrically connected to the drive module 130 to collect an image of a user and transmit a signal corresponding to the collected image to the drive module 130 according to a command from the drive module 130. The sound collection unit 230 is electrically connected to the drive module 130 to collect a voice of a user and transmit a signal corresponding to the collected voice to the drive module 130 according to a command from the drive module 130.

The drive module 130 controls the operation of the display unit 110 and/or the sound output unit 140 according to a signal from the input unit (not shown).

Also, the drive module 130 controls entry into and end of an interactive mode based on information collected by the image collection unit 220 and/or the sound collection unit 230. After entry into the interactive mode, the drive module 130 executes the interactive mode to control the operation of the display unit 110 and/or the sound output unit 140.

The drive module 130 includes a recognition unit 131, a database 132, a network interface 133, a controller 134, a storage unit 135, a display drive unit 136, and a sound drive unit 137.

The recognition unit 131 receives a signal corresponding to the information collected by the image collection unit 220 and/or the sound collection unit 230, recognizes user recognition and an operation command desired by a user based on the received signal, and transmits the recognized operation command to the controller 134, which will be described with reference to FIG. 6.

Figure 6:
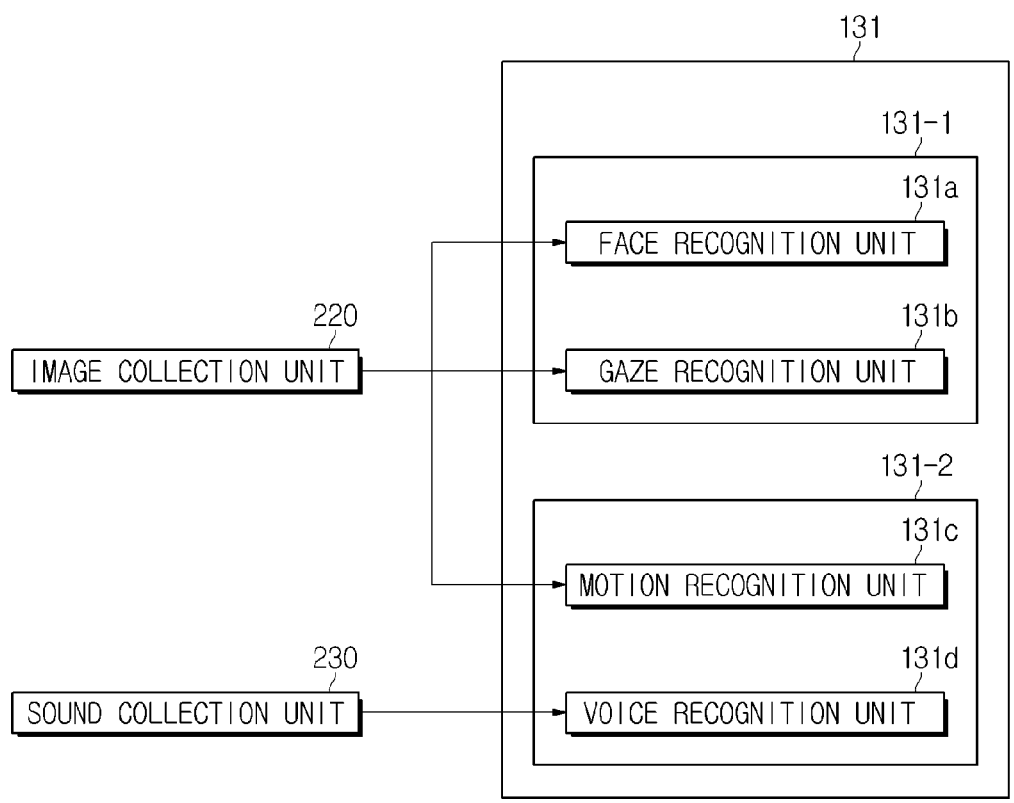
FIG. 6 is a detailed view showing the construction of a recognition unit of the display apparatus according to the embodiment.

FIG. 6 is a detailed view showing the construction of the recognition unit of the display apparatus according to the embodiment. The recognition unit 131 includes a first recognition unit 131-1 to recognize an interactive mode entry command and a second recognition unit 131-2 to recognize a function execution and operation command.

The first recognition unit 131-1 includes a face recognition unit 131*a* and a gaze recognition unit 131*b*.

The face recognition unit 131*a* removes a background region from the image transmitted from the image collection unit 220 to acquire a face image of the user, extracts a face region from the acquired face image of the user using edge and color information, extracts feature points, such as eyes, a nose, and a mouth, from the face region to recognize a face, and compares the recognized face with a preregistered face image to determine whether the recognized face is a face of a preregistered user.

In addition, the recognition unit 131 filters the face image during face recognition to remove noise and performs preprocessing necessary to analyze features of the face image.

The gaze recognition unit 131*b* detects an eye image from the face image of the user and acquires the position of a pupil from the detected eye image to recognize the position of the user's gaze.

The second recognition unit 131-2 includes a motion recognition unit 131*c* and a voice recognition unit 131*d*.

The motion recognition unit 131*c* removes a background region from the image transmitted from the image collection unit 220 to acquire a body image of the user, extracts face, arm, hand, torso, leg, and foot regions from the acquired body image of the user using edge and color information, extracts feature points from the extracted face, arm, hand, torso, leg, and foot regions to recognize a user motion, searches for a motion matching the recognized motion from among motions stored in the database 132, and recognizes an operation command corresponding to the matching motion.

The voice recognition unit 131*d* removes noise from the sound transmitted from the sound collection unit 230 to acquire a voice of the user, extracts a feature vector from the acquired voice of the user, compares the extracted feature vector with a language model or phoneme-based sound model of each word stored in the database 132 to extract candidate words or candidate phonemes, recognizes a sentence based on the candidate words or candidate phonemes, searches for a sentence matching the recognized sentence from among sentences stored in the database 132, and recognizes an operation command corresponding to the searched sentence.

In addition, the voice recognition unit 131*d* may recognize the operation command from the candidate words or candidate phonemes.

Also, the voice recognition unit 131*d* may recognize the user using specific voice information.

The database 132 stores a face image of a preregistered user, feature point information and pupil information of the face image. Also, the database 132 stores an operation command for each motion and an operation command for each voice. The pupil information includes information regarding size and position of a pupil and the distance between pupils. A user may be recognized based on the pupil information.

In addition, in a case in which a plurality of users is present, the database 132 may store an operation command corresponding to a motion for each user and an operation command corresponding to a voice for each user.

An IP address is assigned to the network interface 133 such that the network interface 133 performs network communication and receives and processes a data packet transmitted from the outside through a network. In a case in which the data packet includes multimedia data, i.e. image and sound data, the network interface 133 stores the data packet or transmits the data packet to the controller such that the data packet is reproduced.

For example, the network interface 133 receives content, such as broadcasts, games, VOD, and broadcast signals, and relevant information. Also, the network interface 133 may receive firmware update information and update files.

In addition, the display apparatus may further include an input interface. The input interface may be connected to an external storage device, such as a USB memory, or an optical disc device, such as a DVD or CD, to receive multimedia data and to transmit the received multimedia data to the controller.

When the display apparatus 1 is turned on or an interactive mode is requested through button input of the input unit (not shown), the controller 134 transmits an operation command to the image collection unit 220 and the sound collection unit 230.

The controller 134 decides whether entry into the interactive mode is to be performed based on the determination as to whether the user recognized by the recognition unit 131 has been registered. In a case in which a plurality of users is recognized by the recognition unit 131, the controller 134 confirms a user having highest priority from among the recognized users and controls entry into the interactive mode based on the position of the gaze of the confirmed user.

Also, in a case in which a plurality of users is present, the controller 134 may determine whether a user's gaze is within a recognition region and, upon determining that the user's gaze is within the recognition region, control entry into the interactive mode based on the gaze of the user pointed at the recognition region.

The controller 134 determines a position the user looks at based on the position of the user's gaze transmitted from the recognition unit 131. At this time, the controller 134 determines whether the user's gaze is within the recognition region for a predetermined period of time or more and, upon determining that the user's gaze is within the recognition region for the predetermined period of time or more, controls entry into the interactive mode.

After entry into the interactive mode, the controller 134 controls display information of the recognition region of the display unit 110 differently from the display information before entry into the interactive mode.

After entry into the interactive mode, the controller 134 controls a plurality of recognition modes to receive an operation command through interaction to be displayed. At this time, the controller 134 compares the position of the user's gaze transmitted from the recognition unit 131 with positions of prestored recognition mode buttons to determine a recognition mode the user wishes to select and controls the image collection unit 220 and the sound collection unit 230 to be turned on/off based on the determined recognition mode.

For example, in a case in which a voice recognition mode is selected from among the recognition modes, the controller 134 controls the sound collection unit 230 to be turned on and the image collection unit 220 to be turned off. In a case in which a gaze recognition mode or a motion recognition mode is selected from among the recognition modes, the controller 134 controls the sound collection unit 230 to be turned off and the image collection unit 220 to be turned on.

The operation command includes change of output information, such as display or sound, and change of functions.

The controller 134 controls driving of the respective drive units 136 and 137 based on the operation command transmitted from the recognition unit 131.

When the user's gaze is within the end region for a predetermined period of time or more, the controller 134 controls the interactive mode to be completed.

Figure 7:
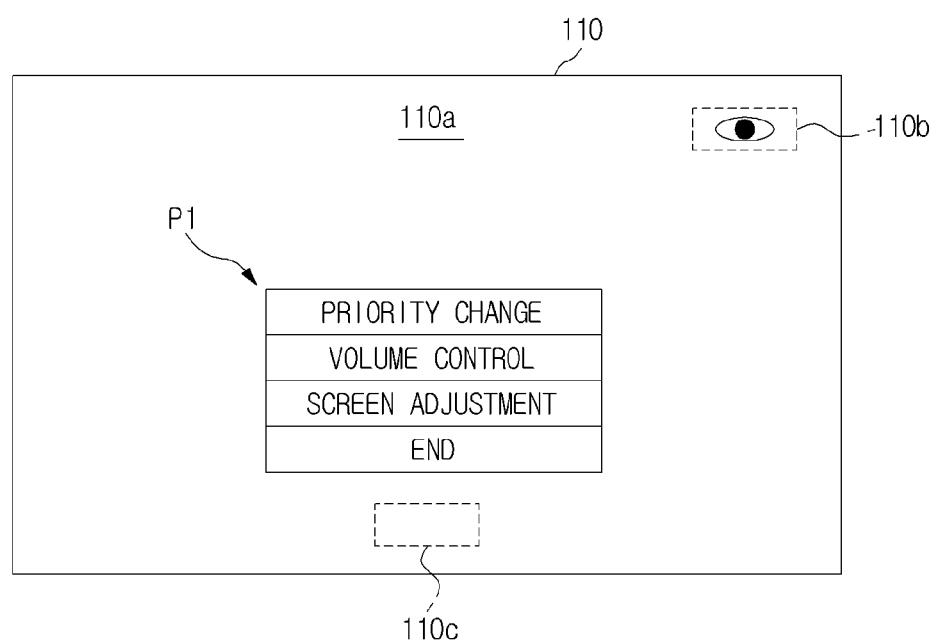
FIG. 7 is a view illustrating a popup menu displayed on the display apparatus according to the embodiment.

When the user's gaze is within the end region for the predetermined period of time or more, the controller 134 may control a popup menu to be displayed. As shown in FIG. 7, the popup menu P1 includes a priority change button, volume control button, screen adjustment button, and end button.

In addition, if the user looks at the recognition region during execution of the recognition mode, the controller 134 may determine that the user wishes to change the recognition mode and control the recognition mode buttons to be redisplayed.

The controller 134 controls a main image signal requested by the user to be displayed and a sound signal requested by the user to be output and controls an image corresponding to the interactive mode to be displayed on the main image in an overlapping fashion during output of the image and the sound.

The storage unit 135 stores priorities of a plurality of preregistered users, positions of the recognition region and the end region, before entry into the interactive mode, entry into the interactive mode, display information of the recognition region corresponding to execution of the interactive mode, and position information of the recognition mode buttons.

The display drive unit 136 drives the display unit 110 based on a command from the controller 134, and the sound drive unit 137 drives the sound output unit 140 based on a command from the controller 134.

The display unit 110, which is an output module, displays an image in the display region based on a command from the controller 134 in the drive module 130 and displays an image corresponding to execution of the interactive mode.

The sound output unit 140, which is another output module, outputs sound based on a command from the controller in the drive module. The sound output unit 140 may be separated from the display apparatus 1.

That is, the sound output unit 140, such as a speaker, may be provided separately from the display apparatus 1 and may be connected to the display apparatus 1 as needed.

Figure 8A:
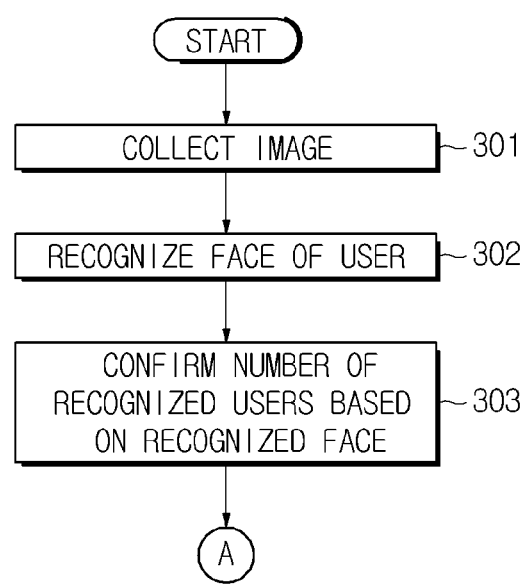
FIGS. 8A and 8B are control flowcharts of the display apparatus according to the embodiment.
Figure 8B:
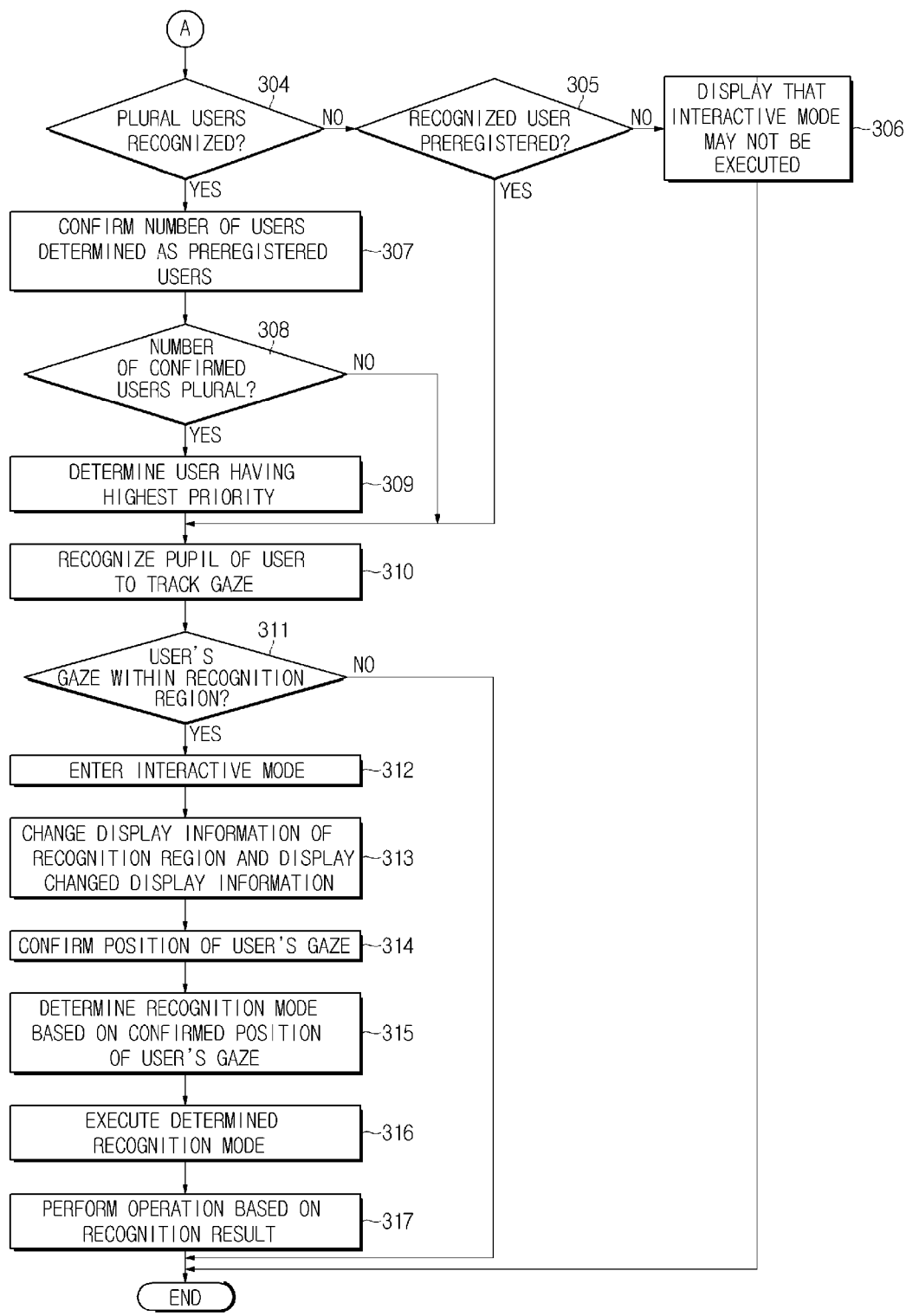

FIGS. 8A and 8B are control flowcharts of the display apparatus according to the embodiment. Control of the display apparatus will be described with reference to FIGS. 1 to 7.

When the display apparatus is turned on by a user, the image collection unit 220 is operated to collect an image (301).

The display apparatus removes a background region from the collected image to acquire an image of the user, extracts a face region using edge and color information of the acquired image, and extracts feature points, such as eyes, a nose, and a mouth, from the face region to recognize a face (302).

Subsequently, the display apparatus confirms the number of recognized users based on the number of recognized faces (303) and determines whether the number of the confirmed users is plural (304).

When only one user has been confirmed, the recognized face is compared with face images of preregistered users to determine whether the user having the recognized face is one of the preregistered users (305). Upon determining that the user having the recognized face is not one of the preregistered users, a message stating that an interactive mode may not be executed is displayed through the display unit 110 (306). Upon determining that the user having the recognized face is one of the preregistered users, a pupil of the recognized face is recognized to track the gaze of the user (310).

When the number of recognized users is plural, the display apparatus compares the recognized faces with face images of preregistered users to determine whether the users having the recognized faces are the preregistered users, to confirm the number of the users determined as the preregistered users (307), and to determine whether the number of the confirmed users is plural (308).

Upon determining that a plurality of preregistered users has been recognized, the display apparatus determines a user having highest priority from among the recognized users (309) and recognizes a pupil of the determined user to track the gaze of the user (310).

Subsequently, the display apparatus determines whether the recognized gaze is within the recognition region (311). Upon determining that the recognized gaze is within the recognition region, the display apparatus determines whether the recognized gaze is pointed at the recognition region for a predetermined period of time or more.

Upon determining that the recognized gaze is pointed at the recognition region for the predetermined period of time or more, the display apparatus enters an interactive mode (312). In addition, the display apparatus changes display information of the recognition region in the display unit 110 and displays the changed display information such that entry into the interactive mode is recognized by the user (313).

Figure 3:
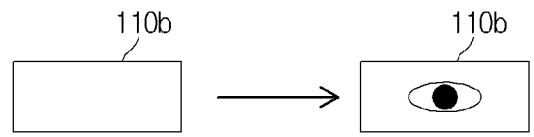
Figure 3:
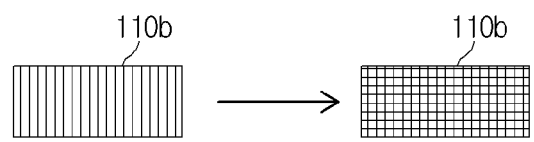

For example, as shown in FIG. 3, an icon may be displayed in the recognition region 110*b* or the color of the recognition region 110*b* may be changed.

Subsequently, the display unit 110 displays a plurality of recognition modes to receive an operation command, confirms the position of the user's gaze (314), and determines a recognition mode selected by the user based on the confirmed position of the user's gaze (315).

That is, the display apparatus determines the position of one of the recognition mode buttons matching the confirmed position of the user's gaze to determine the recognition mode selected by the user.

At this time, the display apparatus displays the position of the user's gaze on the display unit as a cursor in real time such that the user confirms the position of the user's gaze.

Subsequently, the display apparatus executes the determined recognition mode (316). Also, the display apparatus recognizes an operation command based on the recognition result according to execution of the recognition mode and operates the respective drive units based on the recognized operation command (317).

Recognition of an operation command based on selection of each recognition mode will hereinafter be described in more detail.

(1) When motion recognition is selected by a user, the display apparatus operates the image collection unit, removes a background region from an image collected by the image collection unit to acquire a body image of the user, extracts face, arm, hand, torso, leg, and foot regions from the acquired body image of the user using edge and color information, extracts feature points from the extracted face, arm, hand, torso, leg, and foot regions to recognize a user motion, searches for a motion matching the recognized motion from among motions stored in the database 132, and recognizes an operation command corresponding to the matching motion.

Subsequently, the display apparatus drives the respective drive units 136 and 137 based on the recognized operation command to display an image of content requested by the user through the display unit 110 and to output sound of content requested by the user through the sound output unit 140.

(2) When voice recognition is selected by a user, the display apparatus operates the sound collection unit, removes noise from sound collected by the sound collection unit 230 to acquire a voice of the user, extracts a feature vector from the acquired voice of the user, compares the extracted feature vector with a language model or phoneme-based sound model of each word stored in the database 132 to extract candidate words or candidate phonemes, recognizes a sentence based on the candidate words or candidate phonemes, searches for a sentence matching the recognized sentence from among sentences stored in the database 132, and recognizes an operation command corresponding to the searched sentence.

Subsequently, the display apparatus drives the respective drive units 136 and 137 based on the recognized operation command to display an image of content requested by the user through the display unit 110 and to output sound of content requested by the user through the sound output unit 140.

(3) When gaze recognition is selected by a user, the display apparatus operates the image collection unit, displays a popup menu through the display unit 110, recognizes a face and pupil of the user using an image collected by the image collection unit 220, tracks the user's gaze based on the recognized pupil, confirms the position of the tracked gaze, and perform an operation corresponding to a menu selected from the popup menu by the user.

The popup menu includes a plurality of menus, and each menu has an operation command button.

That is, the display apparatus confirms a button having a position matching the position of the user's gaze from among the operation command buttons in the popup menu and performs an operation corresponding to the confirmed button.

For example, it is assumed that a popup menu P1 including a priority change button, volume control button, screen adjustment button, and end button is displayed as shown in FIG. 7. If the position of the user's gaze is present on the volume control button, an up/down button for volume control is displayed on the display unit 110. When the user's gaze is present on the volume up button, volume is turned up. When the user's gaze is present on the volume down button, volume is turned down.

In addition, menu selection through gaze recognition may be determined based on blinking of eyes, time for which the gaze is present on the button, or other action by a user's eye or eyes.

The display apparatus displays content transmitted through the network interface 133 or the input interface on the display unit. At this time, the display apparatus controls a main image signal requested by the user to be displayed and a sound signal requested by the user to be output and controls an image corresponding to the interactive mode to be displayed on the main image in an overlapping fashion during output of the image and the sound.

When the user's gaze is within the end region of the display unit 110 for a predetermined period of time or more, the display apparatus completes the interactive mode. Afterwards, when the user's gaze is within the recognition region, the display apparatus determines that the user wishes to change the recognition mode and redisplays the recognition mode buttons.

In addition, when the user's gaze is outside the display unit 110 for a predetermined period of time or more, the display apparatus may complete the interactive mode.

Figure 9:
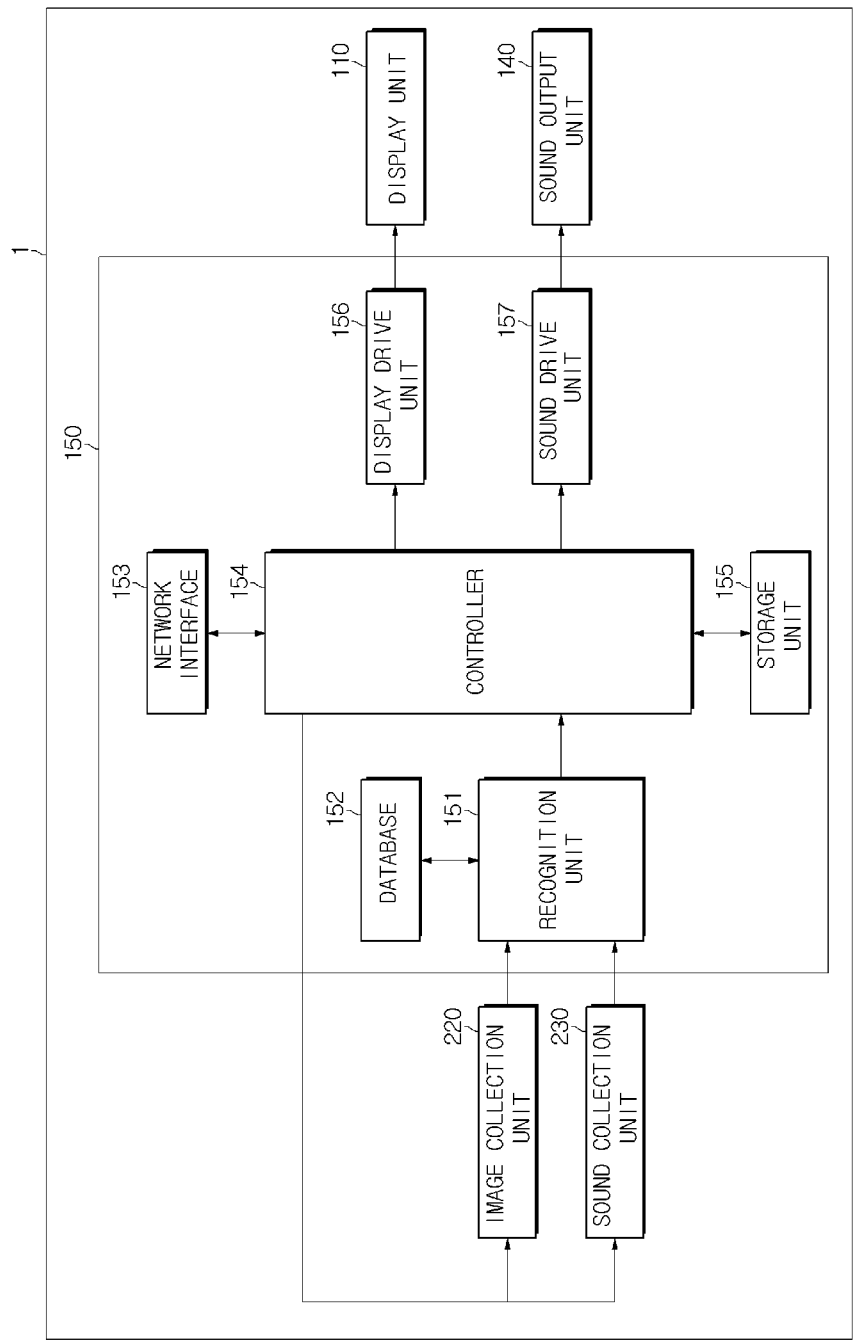
FIG. 9 is a control block diagram of a display apparatus according to another embodiment.

FIG. 9 is a control block diagram of a display apparatus according to another embodiment. In this embodiment, the display apparatus 1 includes an image collection unit 220 and a sound collection unit 230 as a collection module to receive a user command, a drive module 150 to perform operation control based on an operation command, and a display unit 110 and a sound output unit 140 as an output module to output operation execution.

The image collection unit 220, the sound collection unit 230, the display unit 110, and the sound output unit 140 are identical to those of the previous embodiment, and therefore, a description thereof will be omitted.

The drive module 150 includes a recognition unit 151, a database 152, a network interface 153, a controller 154, a storage unit 155, a display drive unit 156, and a sound drive unit 157.

The recognition unit 151 receives a signal corresponding to information collected by the image collection unit 220 and/or the sound collection unit 230, recognizes user recognition and an operation command desired by a user based on the received signal, and transmits the recognized operation command to the controller 154.

The recognition unit 151 determines whether a user having performed a motion is identical to a user looking at a recognition region and, upon determining that the user having performed a motion is identical to the user looking at the recognition region, recognizes an operation command corresponding to the recognized motion in a state in which the user's gaze is within the recognition region.

Also, the recognition unit 151 determines whether a user having spoken is identical to a user looking at a recognition region and, upon determining that the user having performed a motion is identical to the user looking at the recognition region, recognizes an operation command corresponding to the recognized voice in a state in which the user's gaze is within the recognition region.

The recognition unit 151 includes a first recognition unit to recognize the face and gaze of a user and a second recognition unit to recognize a function execution and operation command. The first recognition unit and the second recognition unit are identical to the first recognition unit 131-1 and the second recognition unit 131-2 of the previous embodiment, and therefore, a description thereof will be omitted.

The database 152 stores a face image and pupil information of each user in a matched state. Also, the database 152 stores voice information and pupil information of each user in a matched state.

The other construction of the database 152 and the construction of the network interface 153 are identical to that of the database 132 and that of the network interface 133, and therefore, a description thereof will be omitted.

When the display apparatus 1 is turned on or an interactive mode is requested through button input of an input unit (not shown), the controller 154 transmits an operation command to the image collection unit 220 and the sound collection unit 230.

The controller 154 decides whether entry into the interactive mode is to be performed based on the determination as to whether the user recognized by the recognition unit 151 has been registered. In a case in which a plurality of users is recognized by the recognition unit 151, the controller 154 confirms a user having highest priority from among the recognized users and controls entry into the interactive mode based on the position of the gaze of the confirmed user.

The controller 154 determines whether the user's gaze is within the recognition region for a predetermined period of time or more and, upon determining that the user's gaze is within the recognition region for the predetermined period of time or more, controls entry into the interactive mode.

After entry into the interactive mode, the controller 154 controls a plurality of recognition modes to receive a user command through interaction to be displayed. At this time, the controller 154 compares the position of the user's gaze transmitted from the recognition unit 151 with positions of prestored recognition mode buttons to determine a recognition mode the user wishes to select and controls the image collection unit 220 and the sound collection unit 230 to be turned on/off based on the determined recognition mode.

The recognition modes include motion recognition and voice recognition.

When the motion recognition is selected, the controller 154 receives an operation command corresponding to a first multi-modal mode including a combination of gaze recognition and motion recognition. When the voice recognition is selected, the controller 154 receives an operation command corresponding to a second multi-modal mode including a combination of gaze recognition and voice recognition.

The controller 154 controls driving of the respective drive units 156 and 157 based on the operation command.

When the user's gaze is within an end region for a predetermined period of time or more, the controller 154 controls the interactive mode to be completed.

The controller 154 controls a main image signal requested by the user to be displayed and a sound signal requested by the user to be output.

The storage unit 155 stores priorities of a plurality of preregistered users, positions of the recognition region and the end region, before entry into the interactive mode, entry into the interactive mode, display information of the recognition region corresponding to execution of the interactive mode, and position information of the recognition mode buttons.

The display drive unit 156 and the sound drive unit 157 are identical to those of the previous embodiment, and therefore, a description thereof will be omitted.

Figure 10:
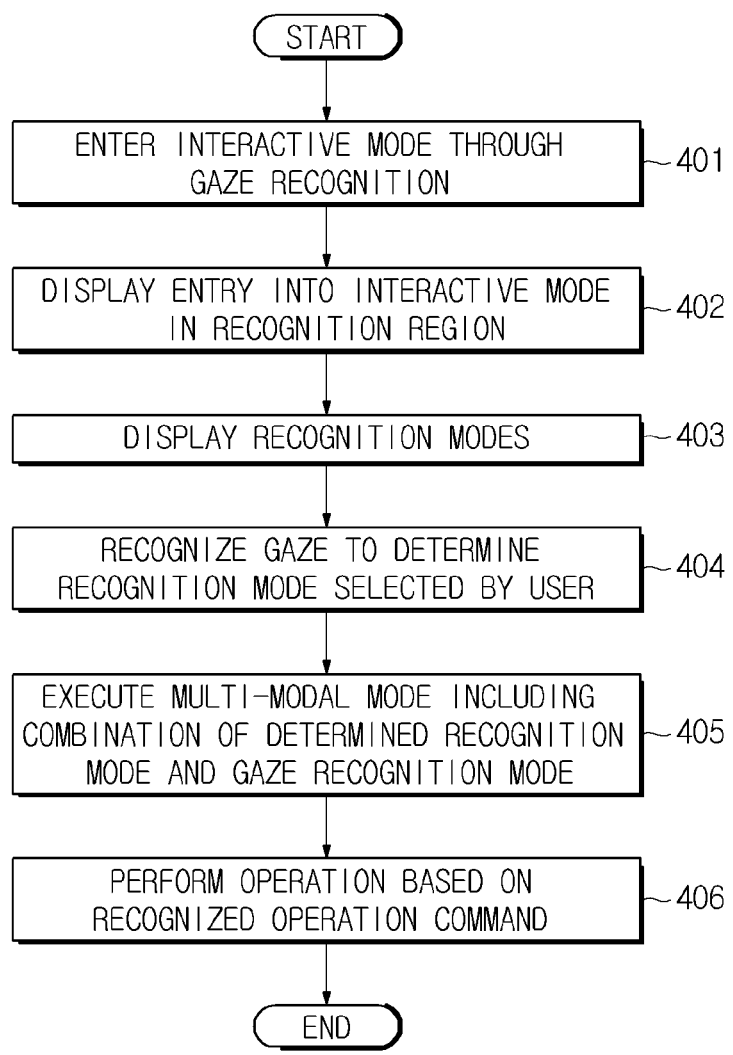
FIG. 10 is a control flowchart of the display apparatus according to the embodiment.

FIG. 10 is a control flowchart of the display apparatus according to the embodiment. Control of the display apparatus will be described with reference to FIGS. 9 and 11.

When the display apparatus is turned on by a user, the image collection unit 220 is operated to collect an image. The display apparatus recognizes faces based on the collected image and confirms the number of recognized users based on the recognized faces.

Subsequently, the display apparatus determines whether a plurality of users has been confirmed, determines preregistered users from among the recognized users, and determines whether the number of the preregistered users corresponding to the preregistered users is plural.

Upon determining that the number of the preregistered users corresponding to the preregistered users is plural, the display apparatus determines a user having highest priority from among the users and recognizes a pupil of the determined user to track the gaze of the user.

Subsequently, the display apparatus determines whether the recognized gaze is within the recognition region. Upon determining that the recognized gaze is within the recognition region, the display apparatus determines whether the recognized gaze is pointed at the recognition region for a predetermined period of time or more. Upon determining that the recognized gaze is pointed at the recognition region for the predetermined period of time or more, the display apparatus enters an interactive mode (401). In addition, the display apparatus changes display information of the recognition region in the display unit 110 and displays the changed display information such that entry into the interactive mode is recognized by the user (402).

The above procedure is identical to that of the previous embodiment.

Subsequently, the display unit 110 displays a plurality of recognition modes to receive an operation command, confirms the position of the user's gaze (403), and determines a recognition mode selected by the user based on the confirmed position of the user's gaze (404).

That is, the display apparatus determines the position of one of the recognition mode buttons matching the confirmed position of the user's gaze to determine the recognition mode selected by the user.

At this time, the display apparatus displays the position of the user's gaze in the display unit 110 as a cursor in real time such that the user confirms the position of the user's gaze.

Subsequently, the display apparatus executes a multi-modal mode including a combination of the determined recognition mode and a gaze recognition mode (405). Also, the display apparatus recognizes an operation command based on the recognition result according to execution of the multi-modal mode and operates the respective drive units based on the recognized operation command (406).

Before executing a first multi-modal mode including a combination of a motion recognition mode and a gaze recognition mode, the display apparatus determines whether a user having performed a motion is identical to a user looking at the recognition region and, upon determining that the user having performed a motion is identical to the user looking at the recognition region, executes an interactive mode based on the first multi-modal mode. Upon determining that the user having performed a motion is not identical to the user looking at the recognition region, a message stating that it is not possible to execute an interactive mode may be displayed.

Also, before executing a second multi-modal mode including a combination of a voice recognition mode and a gaze recognition mode, the display apparatus determines whether a user having spoken is identical to a user looking at the recognition region and, upon determining that the user having spoken is identical to the user looking at the recognition region, executes an interactive mode based on the second multi-modal mode. Upon determining that the user having spoken is not identical to the user looking at the recognition region, a message stating that it is not possible to execute an interactive mode may be displayed.

Recognition of an operation command based on the multi-modal mode will hereinafter be described in more detail.

(1) When motion recognition is selected by a user, the display apparatus executes a first multi-modal mode including a combination of a motion recognition mode and a gaze recognition mode. At this time, the display apparatus operates the image collection unit 220, determines whether a user's gaze is within a recognition region and, upon determining that the user's gaze is within the recognition region, recognizes a user motion in a state in which the user's gaze is within the recognition region, and recognizes an operation command corresponding to the recognized motion.

That is, the display apparatus removes a background region from an image collected by the image collection unit 220 to acquire a body image of the user, extracts face, arm, hand, torso, leg, and foot regions from the acquired body image of the user using edge and color information, extracts feature points from the extracted face, arm, hand, torso, leg, and foot regions to recognize a user motion, searches for a motion matching the recognized motion from among motions stored in the database 152, and recognizes an operation command corresponding to the matching motion.

Subsequently, the display apparatus drives the respective drive units 156 and 157 based on the recognized operation command to display an image of content requested by the user through the display unit 110 and to output sound of content requested by the user through the sound output unit 140.

This example will be described with reference to FIG. 11.

Figure 11:
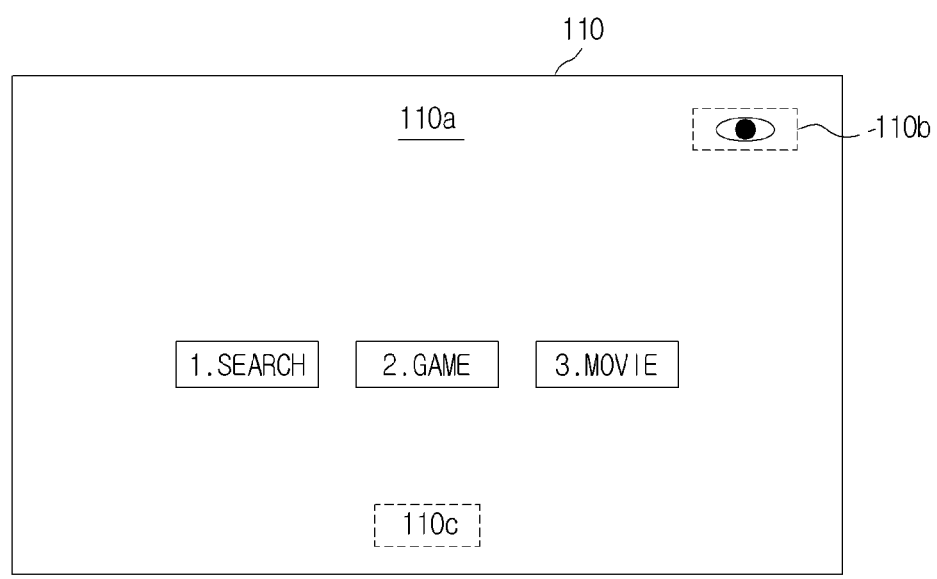
FIG. 11 is a view illustrating display of the display apparatus according to the embodiment.

When the first multi-modal mode is executed in a state in which a plurality of functions is displayed in the display region 110*a* of the display unit as shown in FIG. 11, the display apparatus recognizes a user's gaze and motion using the image collection unit.

On the assumption that the user is looking at the recognition region 110*b* and, at the same time, has performed a one finger stretching motion, the display apparatus recognizes the user's gaze within the recognition region and, at the same time, the one finger stretching motion, and recognizes an operation command corresponding to the one finger stretching motion.

When the operation command corresponding to the one finger stretching motion is 'search', the display apparatus is connected to the Internet via the network interface to perform search.

(2) When voice recognition is selected by a user, the display apparatus executes a second multi-modal mode including a combination of a voice recognition mode and a gaze recognition mode. At this time, the display apparatus operates the sound collection unit 230, determines whether a user's gaze is within a recognition region and, upon determining that the user's gaze is within the recognition region, recognizes a voice of the user in a state in which the user's gaze is within the recognition region, and recognizes an operation command corresponding to the recognized voice.

That is, the display apparatus operates the sound collection unit 230, removes noise from sound collected by the sound collection unit 230 to acquire a voice of the user, extracts a feature vector from the acquired voice of the user, compares the extracted feature vector with a language model or phoneme-based sound model of each word stored in the database 152 to extract candidate words or candidate phonemes, recognizes a sentence based on the candidate words or candidate phonemes, searches for a sentence matching the recognized sentence from among sentences stored in the database 152, and recognizes an operation command corresponding to the searched sentence.

Subsequently, the display apparatus drives the respective drive units 156 and 157 based on the recognized operation command to display an image of content requested by the user through the display unit 110 and to output sound of content requested by the user through the sound output unit 140.

This example will be described with reference to FIG. 11.

When the second multi-modal mode is executed in a state in which a plurality of functions is displayed in the display region 110*a* of the display unit as shown in FIG. 11, the display apparatus recognizes a user's gaze and voice using the image collection unit and the sound collection unit.

On the assumption that the user is looking at the recognition region 110*b* and, at the same time, has said a word 'three', the display apparatus recognizes the user's gaze within the recognition region and, at the same time, the word 'three', and recognizes an operation command corresponding to 'three'.

When the operation command corresponding to 'three' is a 'movie', the display apparatus reproduces a movie downloaded through the network interface or a movie stored in an additional storage device or displays a submenu of the movie.

When an interactive mode is executed during display of a main image in the display unit, an image corresponding to the interactive mode is displayed on the main image in an overlapping fashion.

When the user's gaze is within the end region of the display unit 110 for a predetermined period of time or more, the display apparatus completes the interactive mode. Afterwards, when the user's gaze is within the end region, the display apparatus reperforms entry into the interactive mode and redisplays it.

Figure 12:
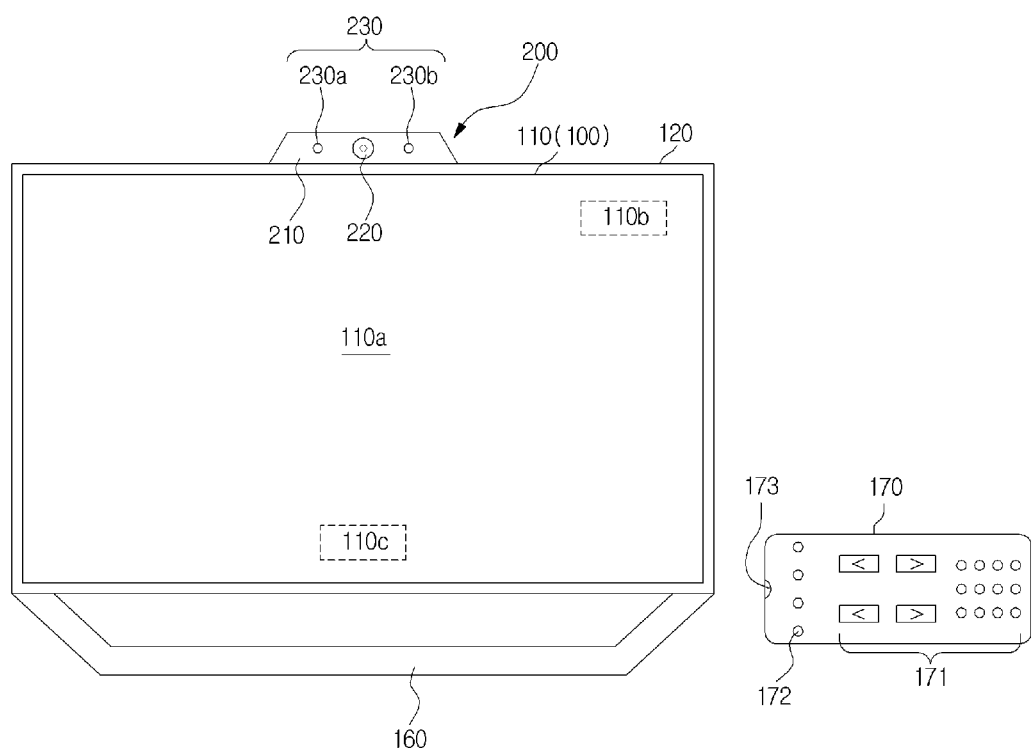
FIG. 12 is a view illustrating a display apparatus according to a further embodiment.

FIG. 12 is a view illustrating a display apparatus according to a further embodiment. Hereinafter, a television will be described as an example of the display apparatus.

In this embodiment, the television includes a main body 100 to display an image, a stand 160 mounted to the bottom of the main body 100 to support the main body 100, and a remote controller 170 to receive a user command.

The stand 160 is detachably coupled to the main body 100. The television may further include a bracket. The main body 100 may be mounted to a wall using the bracket. In this case, the stand may be removed.

The main body 100 includes a display unit 110 to display an image and a bezel 120 to cover an image non-display region. The construction of the main body 100 is identical to that of the previous embodiment, and therefore, a description thereof will be omitted.

The main body 100 may further include an input unit (not shown) having a plurality of buttons to receive a television operation command.

A collection module 200 is provided at the upper end of the bezel 120 of the main body 100 to collect an image and sound of a user and surroundings of the user and to transmit the collected image and sound to a drive module.

The collection module 200 may be mounted at a position where user information may be easily collected in addition to the upper end of the bezel 120 of the main body 100.

Also, the collection module 200 may be provided separately from the television. That is, the collection module 200 may be provided separately from the main body 100 such that the collection module 200 is connected to an interface device (not shown) provided at the main body 100.

The collection module 200 is identical to that of the previous embodiment, and therefore, a description thereof will be omitted.

The remote controller 170 is a device to remotely control television for user convenience.

The remote controller 170 includes a plurality of buttons 171, such as function selection buttons, number buttons, power on/off buttons, channel change buttons, and volume control buttons, a second sound collection unit, i.e. a second microphone 172, to collect a voice signal of a user, a second microprocessor (not shown) to generate an operation signal upon receiving a signal from the buttons 171 and the voice signal, a communication unit 173 to transmit the operation signal generated by the second microprocessor, and a battery to supply driving power to the second microphone, the buttons, the second microprocessor, and the communication unit.

The second sound collection unit 172 may constantly operate.

The remote controller 170 transmits an operation signal, such as a channel change signal or a volume control signal, to the television in response to user manipulation. As a result, the user may conveniently adjust various functions of the television.

In addition, the remote controller may further include a plurality of buttons to select and control an Internet function in addition to the broadcast viewing control buttons in order to control a display apparatus supporting the Internet in addition to broadcast viewing.

Figure 13:
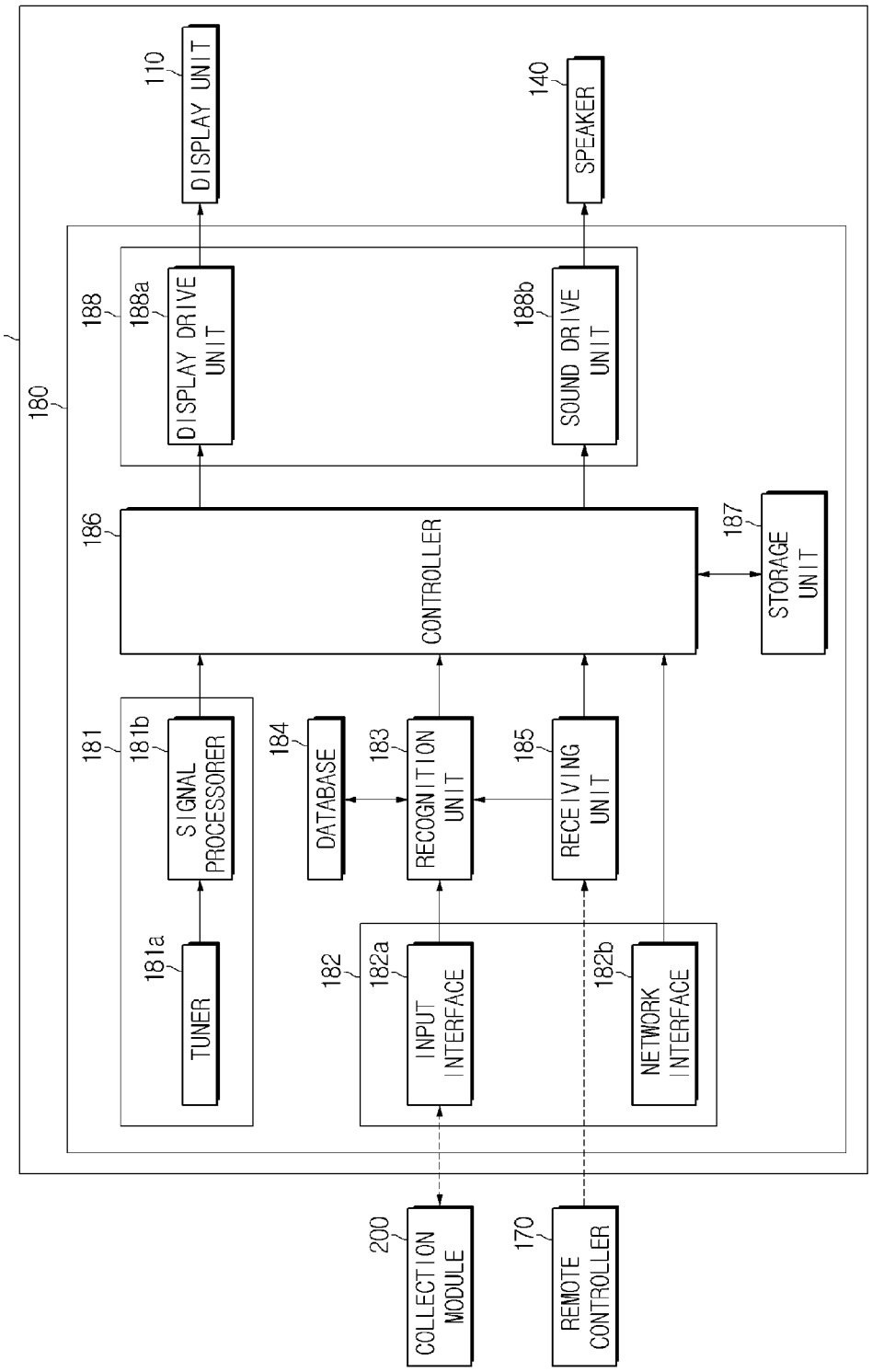
FIG. 13 is a control block diagram of the display apparatus according to the embodiment.

FIG. 13 is a control block diagram of the display apparatus, i.e. the television, according to the embodiment.

The television is operated based on interaction information generated through collection of a user command, a signal from the input unit (not shown) provided at the main body 100, or a signal from the remote controller 170.

The television includes an image collection unit 220 and a sound collection unit 230 as a collection module to collect a user command, the drive module 180 to control the operation of the television based on the user command, and a display unit 110 and a sound output unit 140 as an output module to output operation execution.

The drive module 180 controls the operation of the display unit 110 and/or the sound output unit 140 based on the signal from the input unit (not shown) or the signal from the remote controller 170.

That is, the drive module 180 controls entry into and end of an interactive mode based on information collected by the image collection unit 220 and/or the sound collection unit 230 and, after entry into the interactive mode, executes the interactive mode to control the operation of the display unit 110 and/or the sound output unit 140.

The drive module 180 of the television includes a broadcast unit 181, an interface 182, a recognition unit 183, a database 184, a receiving unit 185, a controller 186, a storage unit 187, and a drive unit 188.

The broadcast unit 181 includes a tuner 181a and a signal processor 181b.

The tuner 181a receives a broadcast signal having a corresponding frequency band according to a tuning control signal from the controller 186 in a wired or wireless fashion to tune the television.

The signal processor 181b separates the broadcast signal into an image signal having image data, a sound signal having sound data, and an additional signal having additional data, signal-processes the separated image signal having image data and sound signal having sound data, and transmits the additional data to a GUI generation unit (not shown). The additional data includes an electronic program guide (EPG).

The signal processor 181b may separate a signal transmitted from a network interface 182b into an image signal having image data and a sound signal having sound data and signal-process the image signal and the sound signal.

The interface unit 182 includes an input interface 182a and a network interface 182b.

The input interface 182a is connected to the collection module 200 to receive an image signal and sound signal collected by the collection module 200 and to transmit the received image signal and sound signal to the recognition unit 183.

An IP address is assigned to the network interface 182b such that the network interface 182b performs network communication and receives and processes a data packet transmitted from the outside through a network. In a case in which the data packet includes multimedia data, i.e. image and sound data, the network interface 182b stores the data packet or transmits the data packet to the controller 186 such that the data packet is reproduced.

The recognition unit 183 recognizes a face and pupil of a user, recognizes the user's gaze based on information of the recognized pupil, and recognizes a user command.

The recognition unit 183 recognizes a voice of the user from the sound signal transmitted from the receiving unit 185 and recognizes an operation command corresponding to the recognized voice.

The other construction of the recognition unit 183 is identical to that of the previous embodiment, and therefore, a description thereof will be omitted.

The database 184 is identical to that of the previous embodiment, and therefore, a description thereof will be omitted.

The receiving unit 185 receives a signal from one of the buttons 171 provided at the remote controller 170 and a sound signal from the second sound collection unit 172 provided at the remote controller 170.

The receiving unit 185 transmits the received button signal and sound signal to the recognition unit 183 and the controller 186.

The controller 186 controls the image data signal-processed by the signal processor 181b to be displayed on the display unit 110 and the signal-processed sound to be output through the sound output unit 140.

The controller 186 determines a user command based on the button signal from the remote controller 170 and controls driving of the display unit 110 according to the determined user command. Upon receiving an Internet function execution request signal from the remote controller 170, the controller 186 controls the network interface for Internet connection. When the user's gaze is within the recognition region, the controller 186 controls driving of the collection module to execute the interactive mode.

The construction of the controller 186 to control entry into the interactive mode and execution of the interactive mode is identical to that of the previous embodiment, and therefore, a description thereof will be omitted.

The storage unit 187 is identical to that of the previous embodiment, and therefore, a description thereof will be omitted.

The drive unit 188 includes a display drive unit 188a and a sound drive unit 188b. The display drive unit 188a and the sound drive unit 188b are identical to those of the previous embodiment, and therefore, a description thereof will be omitted.

Figure 14:
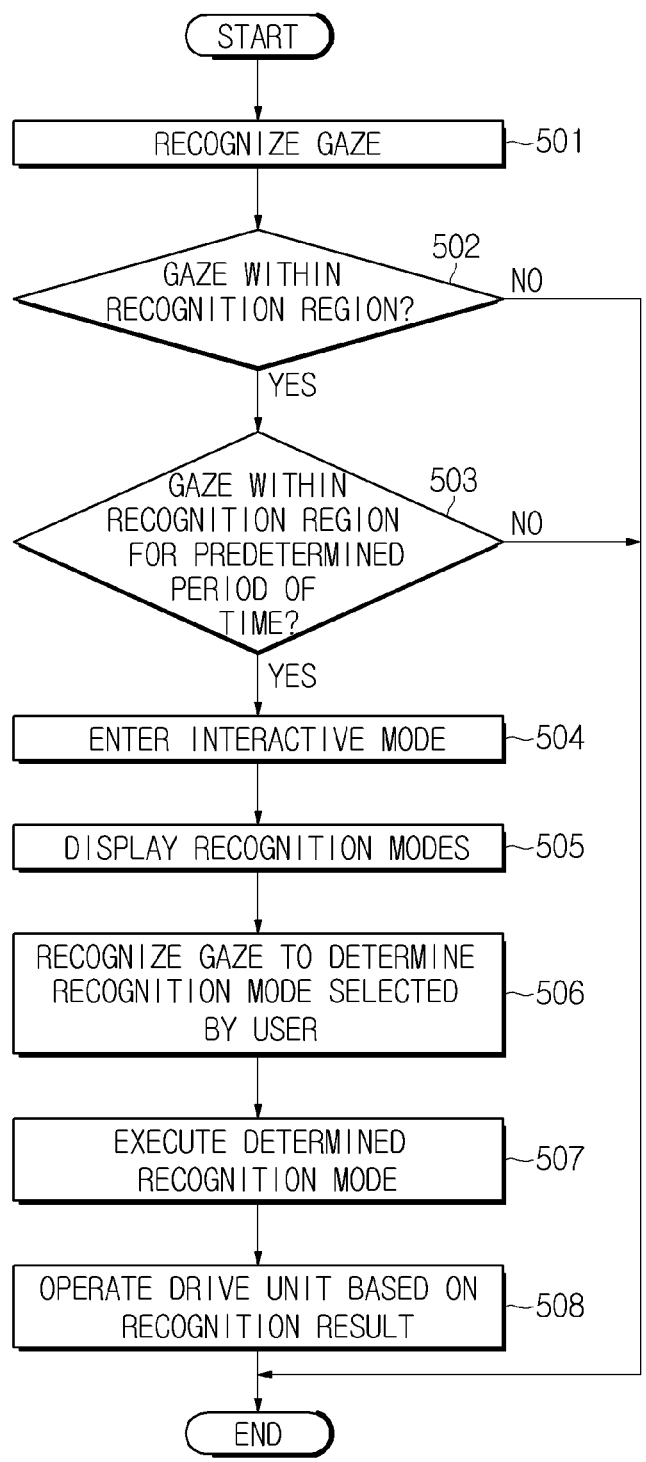
FIG. 14 is a control flowchart of the display apparatus according to the embodiment.

FIG. 14 is a control flowchart of the display apparatus, i.e. the television, according to the embodiment.

When the television is turned on, the image collection unit 220 is operated to collect an image. The television recognizes a face of a user based on the collected image, recognizes a pupil of the user based on the recognized face, and recognizes a gaze corresponding to the position of the pupil (501).

Subsequently, the television determines whether the recognized gaze is within the recognition region (502). Upon determining that the recognized gaze is within the recognition region, the television determines whether the recognized gaze is pointed at the recognition region for a predetermined period of time or more (503). Upon determining that the recognized gaze is pointed at the recognition region for the predetermined period of time or more, the television enters an interactive mode (504). In addition, the television changes display information of the recognition region in the display unit 110 and displays the changed display information such that entry into the interactive mode is recognized by the user such as shown in operation 402 of FIG. 10.

The above procedure is identical to that of the previous embodiment.

Subsequently, the television displays a plurality of recognition modes to receive an operation command (505), confirms the position of the user's gaze, and determines a recognition mode selected by the user based on the confirmed position of the user's gaze (506).

That is, the television determines the position of one of the recognition mode buttons matching the confirmed position of the user's gaze to determine the recognition mode selected by the user.

At this time, the television displays the position of the user's gaze in the display unit 110 as a cursor in real time such that the user may confirm the position of the user's gaze.

Subsequently, the television executes the determined recognition mode (507). Also, the television recognizes an operation command based on the recognition result according to execution of the recognition mode and operates the respective drive units based on the recognized operation command (508).

Recognition of an operation command based on selection of each recognition mode will hereinafter be described in more detail.

(1) When motion recognition is selected by a user, the television recognizes a user motion, searches for a motion matching the recognized motion from among motions stored in the database 184, and recognizes an operation command corresponding to the matching motion.

Subsequently, the television drives the drive unit 188 based on the recognized operation command to display an image of a broadcast or content requested by the user through the display unit 110 and to output sound of a broadcast or content requested by the user through the sound output unit 140.

(2) When voice recognition is selected by a user, the television operates the first sound collection unit 230, recognizes a sentence corresponding to a voice in sound collected by the first sound collection unit 230 or the second sound collection unit 172, searches for a sentence matching the recognized sentence from among sentences stored in the database 184, and recognizes an operation command corresponding to the searched sentence.

Subsequently, the television drives the drive unit 188 based on the recognized operation command to display an image of a broadcast or content requested by the user through the display unit 110 and to output sound of a broadcast or content requested by the user through the sound output unit 140.

(3) When gaze recognition is selected by a user, the television operates the image collection unit, displays a popup menu through the display unit 110, recognizes a face and pupil of the user using an image collected by the image collection unit 220, tracks the user's gaze based on the recognized pupil, confirms the position of the tracked gaze, and performs an operation corresponding to a menu item selected by the user from the popup menu.

The popup menu includes a plurality of menus, and each menu has an operation command button.

That is, the television confirms a button having a position matching the position of the user's gaze from among the operation command buttons in the popup menu and performs an operation corresponding to the confirmed button, which will be described with reference to FIGS. 15 and 16.

Figure 15:
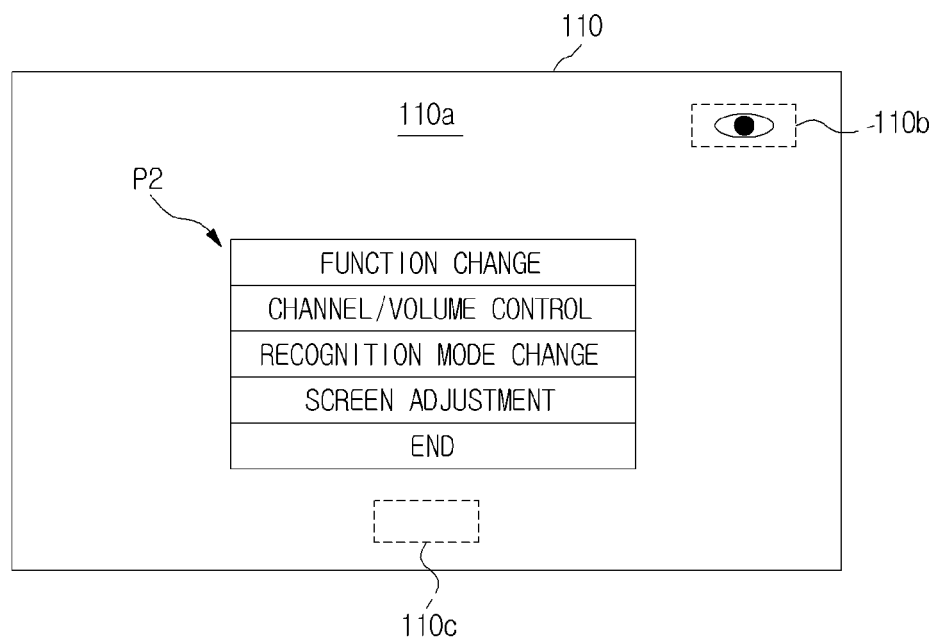
FIGS. 15 and 16 are views illustrating display of the display apparatus according to the embodiment.

In a case in which a popup menu P2 including a function change button, channel/volume control button, recognition mode change button, screen adjustment button, and end button is displayed in the display unit 110 as shown in FIG. 15, a button having a position matching the position of a user's gaze is determined. The function includes a broadcast function, Internet function, and communication function with an external device.

Figure 16:
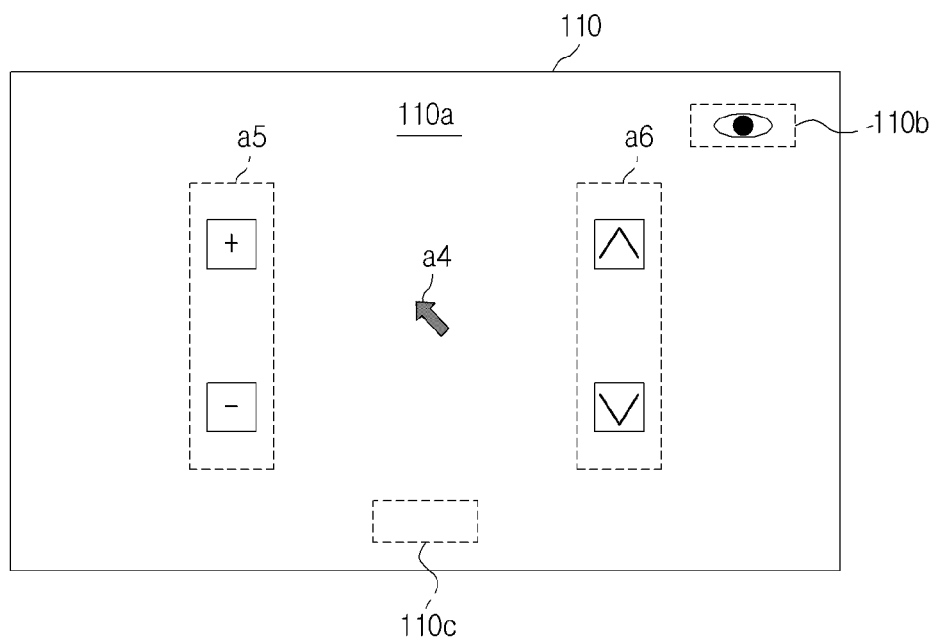

If the position of the user's gaze is present on the channel/volume control button, a volume up/down button a5 for volume control, a channel up/down button a6 for channel adjustment, and a cursor a4 indicating the position of the user's gaze are displayed in the display unit 110 as shown in FIG. 16.

Subsequently, the television compares the position of the user's gaze with the position of the volume up/down button a5 and the channel up/down button a6 to turn the channel/volume up/down.

In addition, menu selection through gaze recognition may be determined based on blinking of eyes or time for which the gaze is present on the button.

At this time, the television displays a button for gaze recognition on a main image displayed in the display unit in an overlapping fashion.

When the user's gaze is within the end region of the display unit 110 for a predetermined period of time or more, the television completes the interactive mode. Afterwards, when the user's gaze is within the recognition region, the television determines that the user wishes to change the recognition mode and redisplays the recognition mode buttons.

In addition, when the user's gaze is outside the display unit 110 for a predetermined period of time or more, the television may complete the interactive mode.

In accordance with an aspect of the present disclosure as described above, a user's gaze is tracked to perform entry into an interactive mode, thereby easily achieving entry into the interactive mode and performing more intuitive interaction.

Also, a multi-modal interactive mode including a combination of face recognition, voice recognition, and gaze recognition is performed, thereby performing a more extended interactive mode and accurately determining a user command. As a result, functions are correctly performed, thereby improving user convenience.

In addition, the position of a user's gaze is displayed on a display apparatus as a cursor, thereby correctly confirming the position of the user's gaze.

Additionally, a user is recognized from a face or pupil of the user, and a gaze, voice, and motion are recognized considering features of the recognized user, thereby improving recognition efficiency.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A display apparatus comprising:
    an image collection unit to collect an image of a user;
    a sound collection unit to collect a voice of the user;
    a gaze recognition unit to recognize a gaze of the user using the collected image;
    a motion recognition unit to recognize a motion of the user using the collected image;

a voice recognition unit to recognize a voice of the user using the collected voice;

a controller configured to determine whether the recognized gaze is within a predetermined recognition region and to control entry into an interactive mode upon determining that the recognized gaze is within the predetermined recognition region; and a display unit to display an image corresponding to the interactive mode, wherein, upon entering the interactive mode, the controller is configured to control display of a plurality of recognition modes for interaction with the user, the plurality of recognition modes including a gaze recognition mode, a motion recognition mode and a voice recognition mode, and to select one of the plurality of recognition modes based on a position of the recognized gaze, wherein if the gaze recognition mode is selected, the controller is configured to control the motion recognition mode and the voice recognition mode to be turned off, wherein if the motion recognition mode is selected, the controller is configured to control the gaze recognition mode and the voice recognition mode to be turned off, and wherein if the voice recognition mode is selected, the controller is configured to control the gaze recognition mode and the motion recognition mode to be turned off.

2. The display apparatus according to claim 1, wherein the display unit displays the predetermined recognition region.

3. The display apparatus according to claim 2, wherein, when the gaze is recognized, the controller displays display information of the predetermined region differently from display information before the gaze is recognized.

4. The display apparatus according to claim 1, wherein the display unit displays a position of the recognized gaze as a cursor.

5. The display apparatus according to claim 1, further comprising a face recognition unit to recognize a face of the user using the collected image, wherein the controller determines whether the recognized user is a preregistered user and, upon determining that the recognized user is the preregistered user, controls gaze recognition of the user.

6. The display apparatus according to claim 5, wherein, in a case in which a plurality of users is recognized, the controller controls gaze recognition of a user having highest priority based on prestored priorities.

7. The display apparatus according to claim 1, wherein the controller determines whether the recognized gaze is within a predetermined end region and, upon determining that the recognized gaze is within the predetermined end region, controls the interactive mode to be completed.

8. The display apparatus according to claim 1, wherein the controller controls activation of the image collection unit and the sound collection unit based on the selected recognition mode.

9. A display apparatus comprising:

a tuner to receive an external broadcast signal;

a signal processor to separate the broadcast signal into an image signal having image information and a sound signal having sound information and to signal-process the separated image signal and sound signal;

an image collection unit to collect an image of a user;

a sound collection unit to collect a voice of the user;

a gaze recognition unit to recognize a gaze of the user using the collected image;

a motion recognition unit to recognize a motion of the user using the collected image;

a voice recognition unit to recognize a voice of the user using the collected voice;

a controller configured to determine whether the recognized gaze is within a predetermined recognition region, to control entry into an interactive mode upon determining that the recognized gaze is within the predetermined recognition region, wherein, upon entering the interactive mode, the controller is configured to select one of a gaze recognition mode, a motion recognition mode and a voice recognition mode based on a position of the recognized gaze;

a display unit to display the signal-processed image signal and an image corresponding to the interactive mode; and a sound output unit to output the signal-processed sound signal, wherein, upon entering the interactive mode, the controller turns off the other recognition modes based on the selected recognition mode, controls at least one function based on a recognized command corresponding to the selected recognition mode.

10. The display apparatus according to claim 9, wherein the display unit displays the predetermined recognition region, a channel button, and a volume button, and displays a position of the recognized gaze as a cursor.

11. The display apparatus according to claim 10, wherein, when the gaze of the user is outside the region of the display unit, the controller controls the interactive mode to be completed.

12. A control method of a display apparatus comprising:

recognizing a gaze of a user;

determining whether the recognized gaze is within a predetermined recognition region;

entering an interactive mode upon determining that the recognized gaze is within the predetermined recognition region;

displaying a plurality of recognition modes for interaction with the user, the plurality of recognition modes including a gaze recognition mode, a motion recognition mode and a voice recognition mode;

determining a recognition mode corresponding to a position of the recognized gaze from among the displayed recognition modes;

if the gaze recognition mode is selected, controlling the motion recognition mode and the voice recognition mode to be turned off, and collecting an image of the user;

if the motion recognition mode is selected, controlling the gaze recognition mode and the voice recognition mode to be turned off, and collecting an image of the user;

if the voice recognition mode is selected, controlling the gaze recognition mode and the motion recognition mode to be turned off, and collecting an voice of the user;

executing the determined recognition mode to recognize a command from the user in the determined recognition mode; and executing a function corresponding to the recognized command.

13. The control method according to claim 12, further comprising displaying the predetermined recognition region as different display information upon entering the interactive mode.

14. The control method according to claim 12, wherein the entering the interactive mode comprises determining whether the gaze is pointed at the predetermined region for a predetermined period of time.

15. The control method according to claim 12, further comprising:
    recognizing a face of the user;
    determining whether the recognized user is a preregistered user;
    recognizing a gaze of the user upon determining that the recognized user is the preregistered user.

16. The control method according to claim 12, further comprising:
    determining whether the recognized gaze is within a predetermined end region; and
    completing the interactive mode upon determining that the recognized gaze is within the predetermined end region.

17. The control method according to claim 12, further comprising completing the interactive mode when the gaze of the user is outside the region of the display unit for a predetermined period of time or more.

18. The control method according to claim 12, further comprising displaying a position of the recognized gaze as a cursor.

19. The control method according to claim 12, further comprising completing the interactive mode when a position of the recognized gaze alternately moves inside and outside the predetermined recognition region.

\* \* \* \* \*